US012077000B2

(12) United States Patent
Shirono et al.

(10) Patent No.: US 12,077,000 B2
(45) Date of Patent: Sep. 3, 2024

(54) LIQUID DISCHARGING APPARATUS

(71) Applicant: BROTHER KOGYO KABUSHIKI KAISHA, Nagoya (JP)

(72) Inventors: Taichi Shirono, Nagoya (JP); Yoshinori Osakabe, Seto (JP); Fumio Nakazawa, Okazaki (JP); Sosuke Kuroyanagi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/488,491

(22) Filed: Sep. 29, 2021

(65) Prior Publication Data

US 2022/0097407 A1 Mar. 31, 2022

(30) Foreign Application Priority Data

Sep. 30, 2020 (JP) ................................ 2020-166224

(51) Int. Cl.
*B41J 2/175* (2006.01)
*B41J 2/045* (2006.01)

(52) U.S. Cl.
CPC ....... *B41J 2/17596* (2013.01); *B41J 2/04501* (2013.01); *B41J 2/17523* (2013.01)

(58) Field of Classification Search
CPC .... B41J 2/04501; B41J 2/175; B41J 2/17506; B41J 2/17509; B41J 2/17513;
(Continued)

(56) References Cited

U.S. PATENT DOCUMENTS 6,007,192 A 12/1999 Ahn
2003/0132980 A1 7/2003 Yamazaki et al.
(Continued)

FOREIGN PATENT DOCUMENTS

JP 2010-105189 A 5/2010
JP 2012-011643 A 1/2012
(Continued)

OTHER PUBLICATIONS

International Search Report and Written Opinion dated Nov. 30, 2021 from related PCT/JP2021/035143.
(Continued)

*Primary Examiner* — Anh T Vo
(74) *Attorney, Agent, or Firm* — Scully, Scott, Murphy & Presser, P.C.

(57) ABSTRACT

A liquid discharging apparatus, having a head, a reservoir section, a valve, a switching assembly, and a controller, is provided. The reservoir section has a liquid reservoir chamber, an air chamber, an injection port, and an atmosphere communication path. The switching assembly switches states of the valve between an opening state, in which the valve opens the atmosphere communication path, and a closing state, in which the valve closes the atmosphere communication path. The controller is configured to control the valve through the switching assembly to close the atmosphere communication path, control the head to discharge the liquid after closing the atmosphere communication path, and control the valve through the switching assembly to close the atmosphere communication path before the liquid is injected through the injection port.

13 Claims, 14 Drawing Sheets

(58) Field of Classification Search
CPC .. B41J 2/1752; B41J 2/17523; B41J 2/17556; B41J 2/17596; B41J 29/02
See application file for complete search history.

(56) References Cited

U.S. PATENT DOCUMENTS

| | | | | |
|---|---|---|---|---|
| 2006/0170739 | A1* | 8/2006 | Koga | B41J 2/175 347/85 |
| 2007/0024682 | A1 | 2/2007 | Inoue | |
| 2008/0252670 | A1* | 10/2008 | LaBar | B41J 29/13 347/49 |
| 2011/0057971 | A1* | 3/2011 | Yokoyama | B41J 2/17509 347/7 |
| 2017/0120617 | A1 | 5/2017 | Matsumura et al. | |
| 2020/0101752 | A1* | 4/2020 | Horade | B41J 2/17503 |
| 2020/0247135 | A1* | 8/2020 | Higuchi | B41J 29/13 |
| 2020/0290362 | A1 | 9/2020 | Tajima et al. | |
| 2020/0369038 | A1 | 11/2020 | Miyazawa et al. | |

FOREIGN PATENT DOCUMENTS

| | | | |
|---|---|---|---|
| JP | 2017-077705 | A | 4/2017 |
| JP | 2017-081077 | A | 5/2017 |
| JP | 2017-081120 | A | 5/2017 |
| JP | 2017-081121 | A | 5/2017 |
| JP | 2019-055597 | A | 4/2019 |
| WO | 2020/106283 | A1 | 5/2020 |

OTHER PUBLICATIONS

International Search Report and Written Opinion dated Nov. 30, 2021 from related PCT/JP2021/035168.
Official Action dated Jan. 6, 2023 in a related application, namely, U.S. Appl. No. 17/488,361 dated Sep. 29, 2021.
Final Official Action dated Apr. 17, 2023 in a related application, namely, U.S. Appl. No. 17/488,361 dated Sep. 29, 2021.
Office Action dated Oct. 6, 2023 received in U.S. Appl. No. 17/488,361.
Office Action dated Mar. 5, 2024 received in U.S. Appl. No. 17/488,361.

* cited by examiner

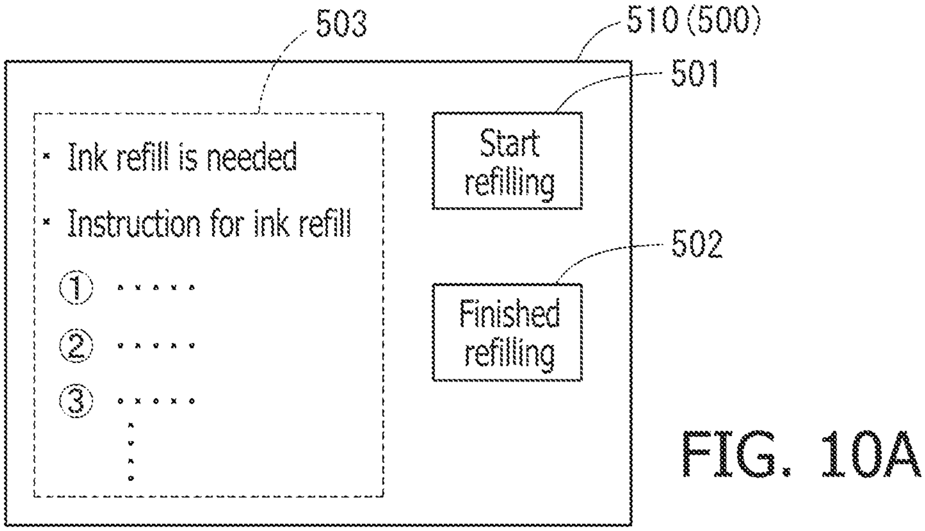
FIG. 10A
FIG. 10B
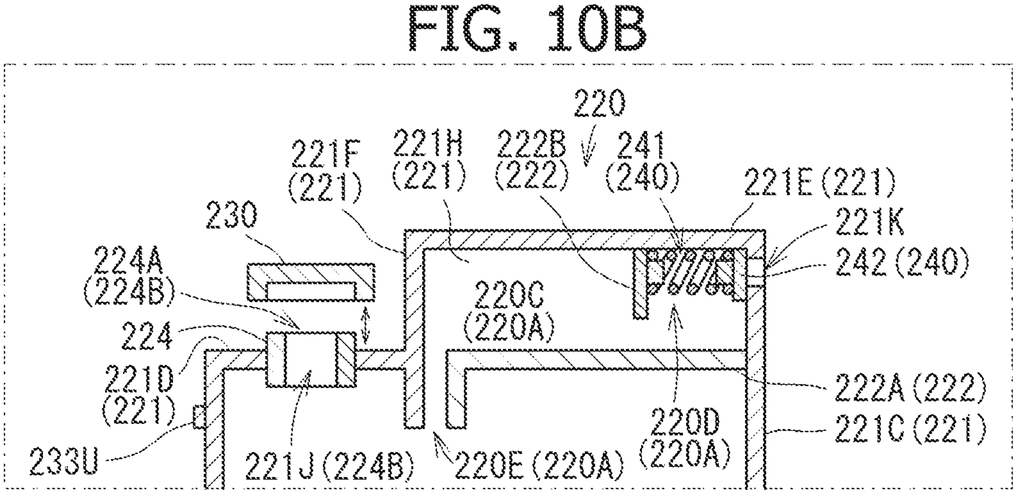
FIG. 10C
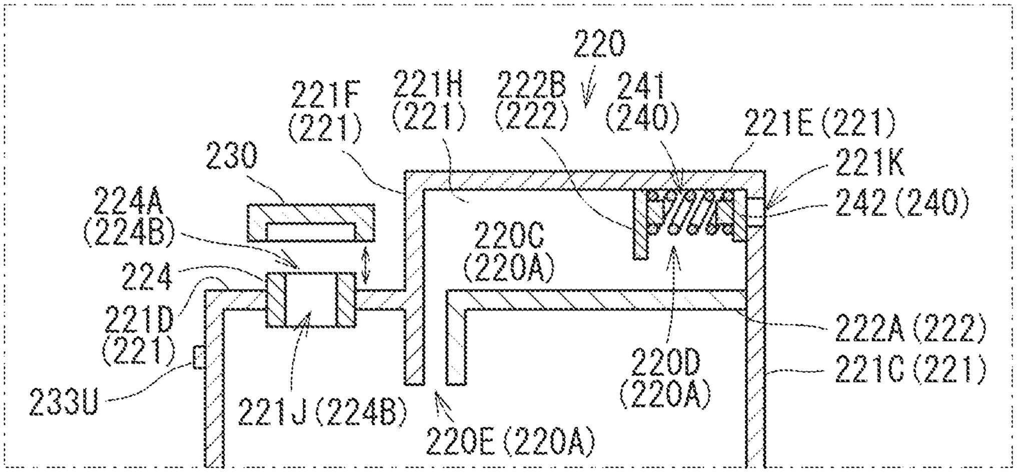

LIQUID DISCHARGING APPARATUS

CROSS REFERENCE TO RELATED APPLICATION

This application claims priority under 35 U.S.C. § 119 from Japanese Patent Application No. 2020-166224, filed on Sep. 30, 2020, the entire subject matter of which is incorporated herein by reference.

BACKGROUND

Technical Field

The present disclosure relates to a liquid discharging apparatus capable of performing a discharging action to discharge liquid at a sheet.

Related Art

A liquid discharging apparatus, which may discharge liquid at a sheet, is known. The liquid to be discharged may be supplied from a reservoir section through a liquid supplying path and discharged from nozzles of a head at the sheet. The reservoir section may have an injection port, through which the liquid may be injected, and an atmosphere communication path. During a discharging action by the head, the injection port may be closed by a lid. Meanwhile, during the discharging action, the liquid supplying path and the atmosphere communication path may be open to outside atmosphere through a valve unit, which may operate in conjunction with a user's operations. On the other hand, for injecting the liquid while no discharging action is being performed, the liquid supplying path and the atmosphere communication path may be closed by the valve unit, and the lid may be removed from the injection port. Through the injection port being open, the liquid may be injected into the reservoir section.

SUMMARY

Occasionally, during the discharging action, a sheet may jam in the liquid discharging apparatus, and the jammed sheet may undesirably contact the head. The sheet contacting the head may lead the liquid to leak outside from the nozzles of the head and stain the sheet. In this regard, when the liquid supplying path and the atmosphere communication path are open during the discharging action, the air may keep entering the reservoir section through the atmosphere communication path while the liquid leaks out from the reservoir section, and the liquid may continuously leak out and spread to a larger extent.

In order to restrain leakage of the liquid to a smaller extent, it may be considered that the liquid supplying path and the atmosphere communication path should be closed. However, with the liquid supplying path and the atmosphere communication path being closed, as the discharging action continues, the air pressure in the reservoir section may be lowered shortly, depending on an amount of the liquid stored in the reservoir section. As a result, the air may be inhaled into the head through the nozzles, and the liquid may not be discharged correctly.

The present disclosure is advantageous in that a liquid discharging apparatus, in which leakage of liquid to a larger extent and liquid discharging failure that may occur during a discharging action may be restrained, is provided.

According to an aspect of the present disclosure, a liquid discharging apparatus, having a head, a reservoir section, a valve, a switching assembly, and a controller, is provided. The head is configured to discharge liquid. The reservoir section has a liquid reservoir chamber, an air chamber connected with the liquid reservoir chamber, an injection port connecting the liquid reservoir chamber and outside of the reservoir section, and an atmosphere communication path connecting the air chamber and the outside of the reservoir section. The valve is configured to open and close the atmosphere communication path. The switching assembly is configured to switch states of the valve between an opening state, in which the valve opens the atmosphere communication path, and a closing state, in which the valve closes the atmosphere communication path. The controller configured to control the valve through the switching assembly to close the atmosphere communication path, control the head to discharge the liquid after closing the atmosphere communication path, and control the valve through the switching assembly to close the atmosphere communication path before the liquid is injected through the injection port.

According to an aspect of the present disclosure, a liquid discharging apparatus, having a head, a reservoir section, a valve, a switching assembly, and a controller, is provided. The head is configured to discharge liquid. The reservoir section has a liquid reservoir chamber, an injection port connecting the liquid reservoir chamber and outside of the reservoir section, and an atmosphere communication path connecting the liquid reservoir chamber and the outside of the reservoir section through a cavity. The valve is configured to open and close the atmosphere communication path. The switching assembly is configured to switch states of the valve between an opening state, in which the valve opens the atmosphere communication path, and a closing state, in which the valve closes the atmosphere communication path. The controller is configured to control the valve through the switching assembly to close the atmosphere communication path, control the head to discharge the liquid after closing the atmosphere communication path, and control the valve through the switching assembly to close the atmosphere communication path before the liquid is injected through the injection port.

BRIEF DESCRIPTION OF THE ACCOMPANYING DRAWINGS

Figure 6A:
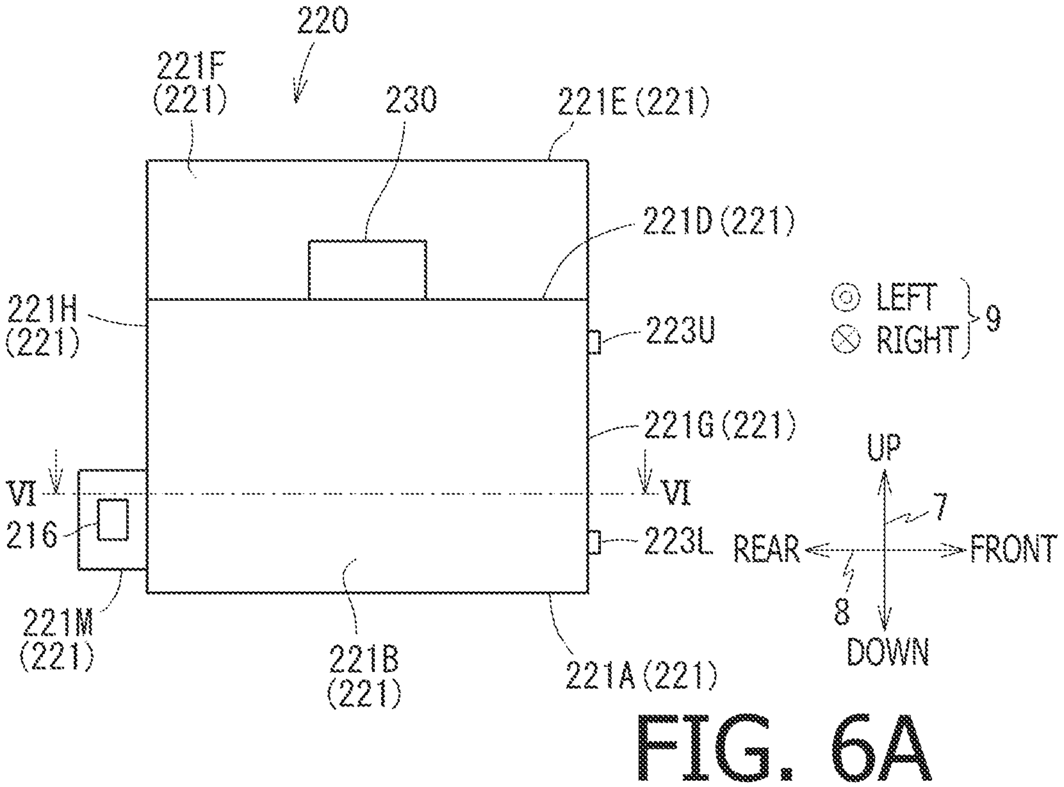
Figure 6B:
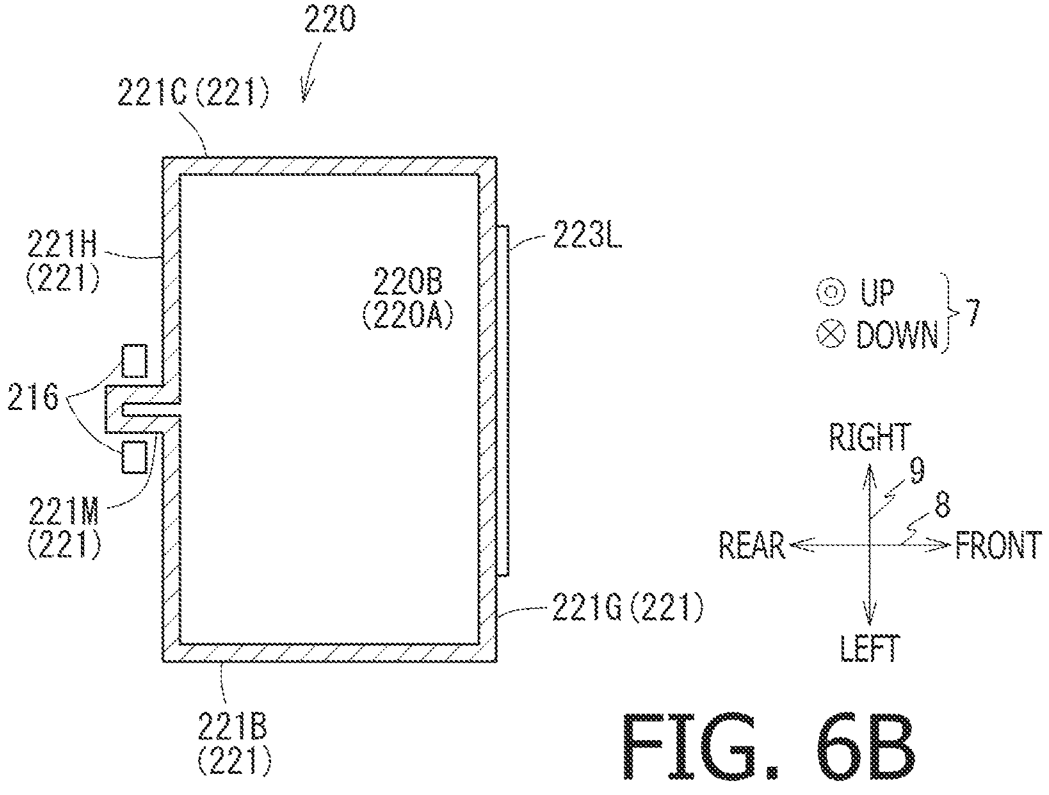

FIG. 6A is an illustrative leftward side view of a liquid amount sensor 216 according to the embodiment of the present disclosure. FIG. 6B is a cross-sectional view of the reservoir section 220 with the liquid amount sensor 216, sectioned at a dash-and-dot line VI-VI indicated in FIG. 6A, according to the embodiment of the present disclosure.

Figure 7:
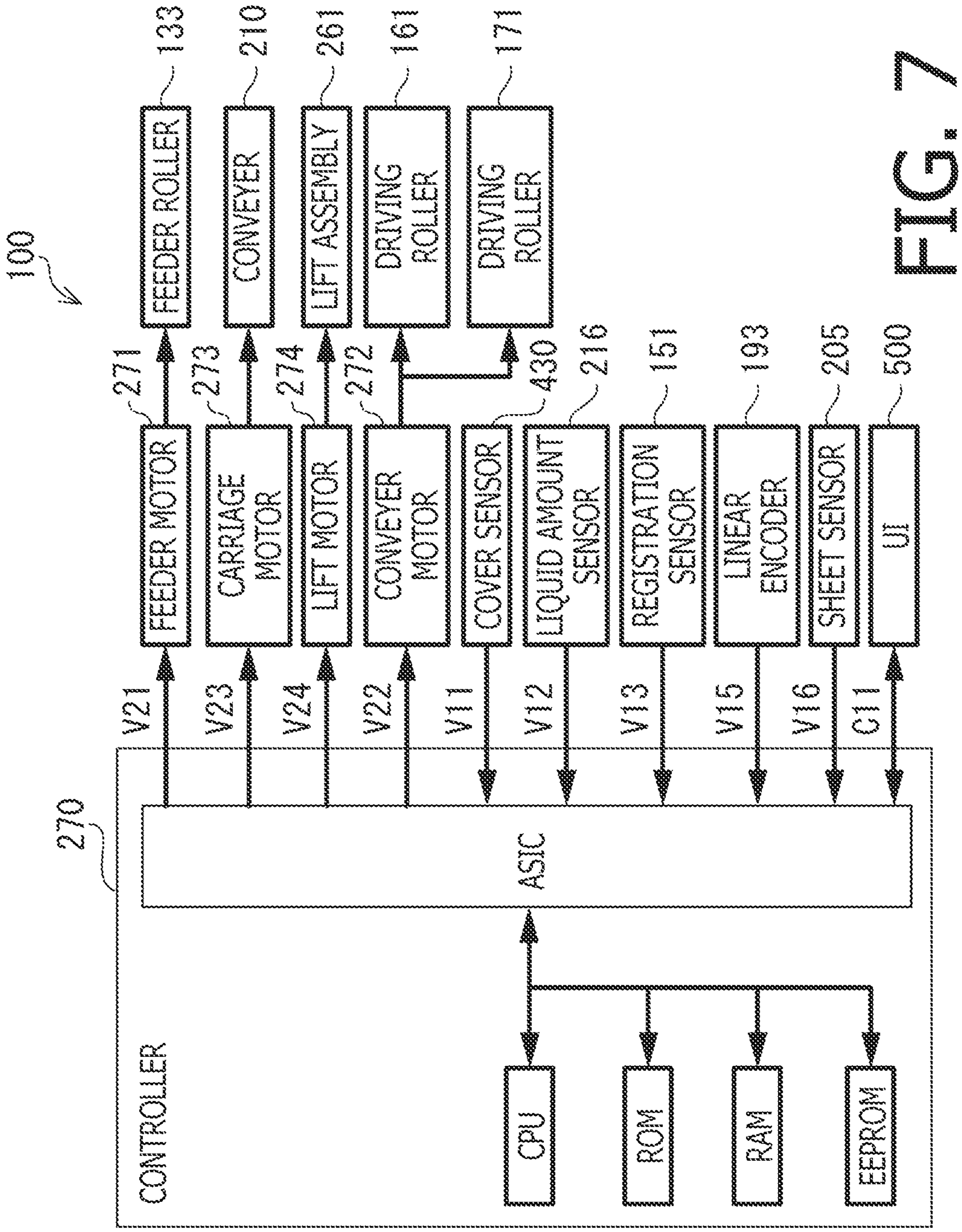

FIG. 7 is a block diagram to illustrate functional blocks in the printer 100 according to the embodiment of the present disclosure.

Figure 8:
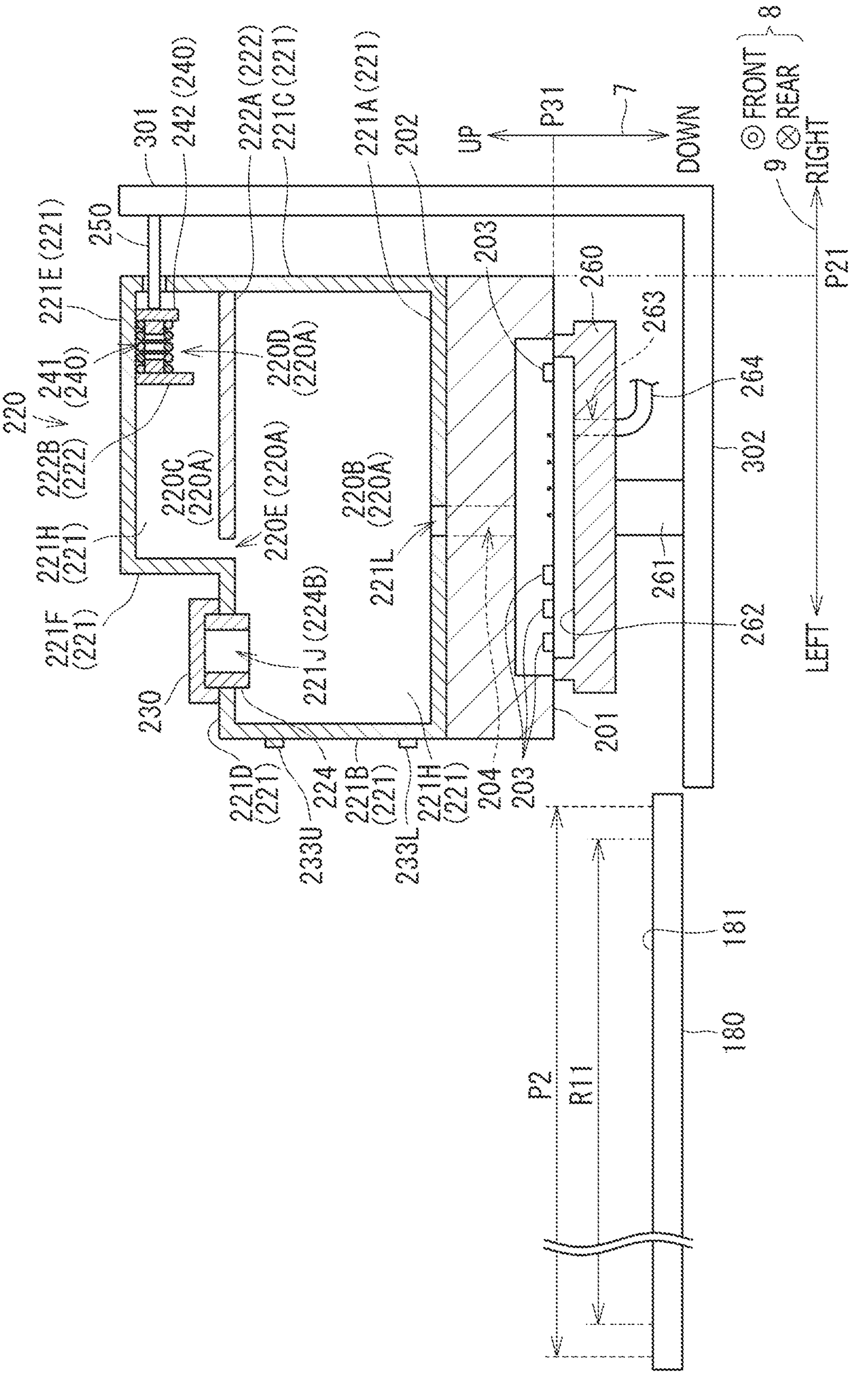

FIG. 8 is an illustrative view of a valve unit 240 with a valve body 242 opening an atmosphere communication path 221K in the printer 100 according to the embodiment of the present disclosure.

Figure 9A:
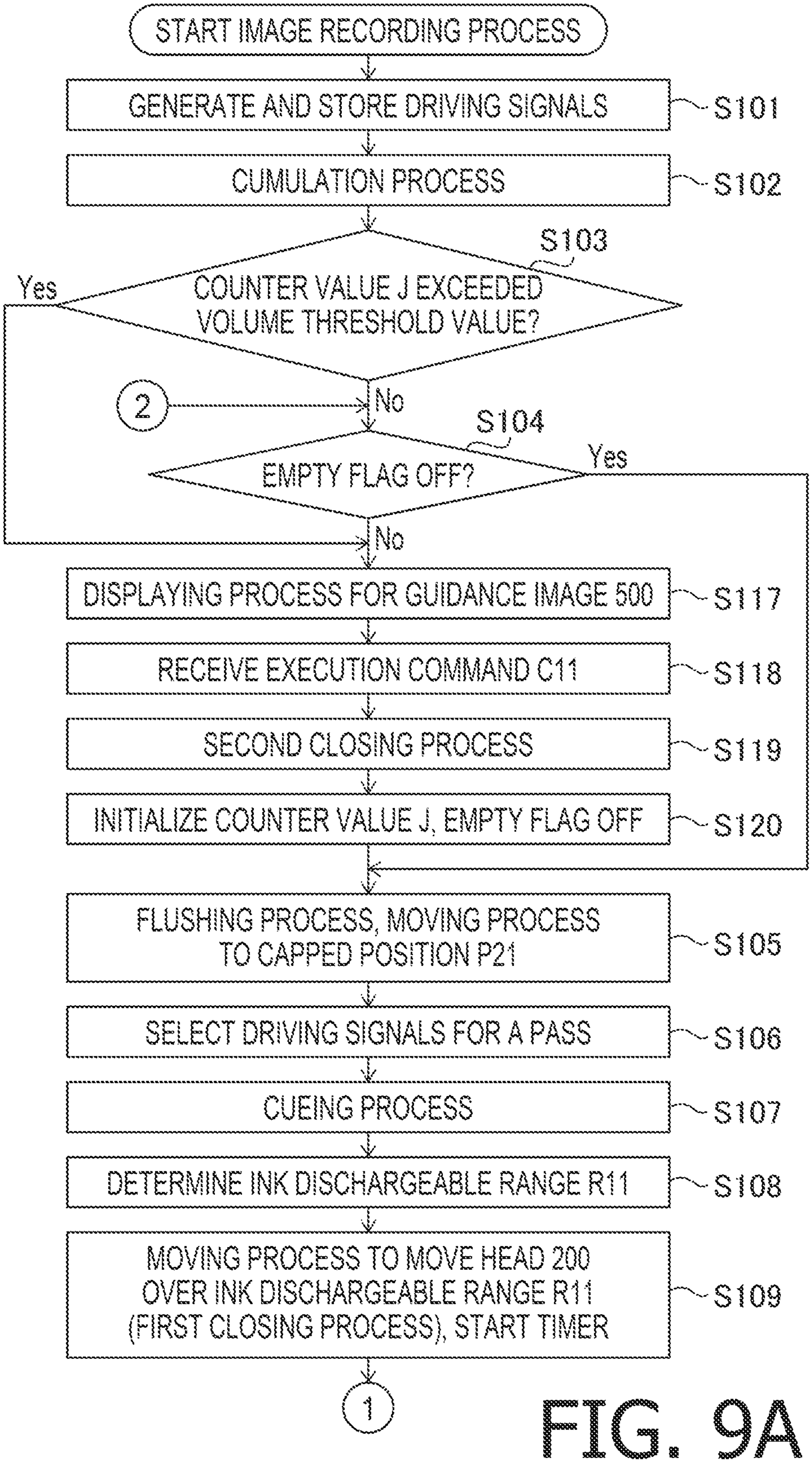
Figure 9B:
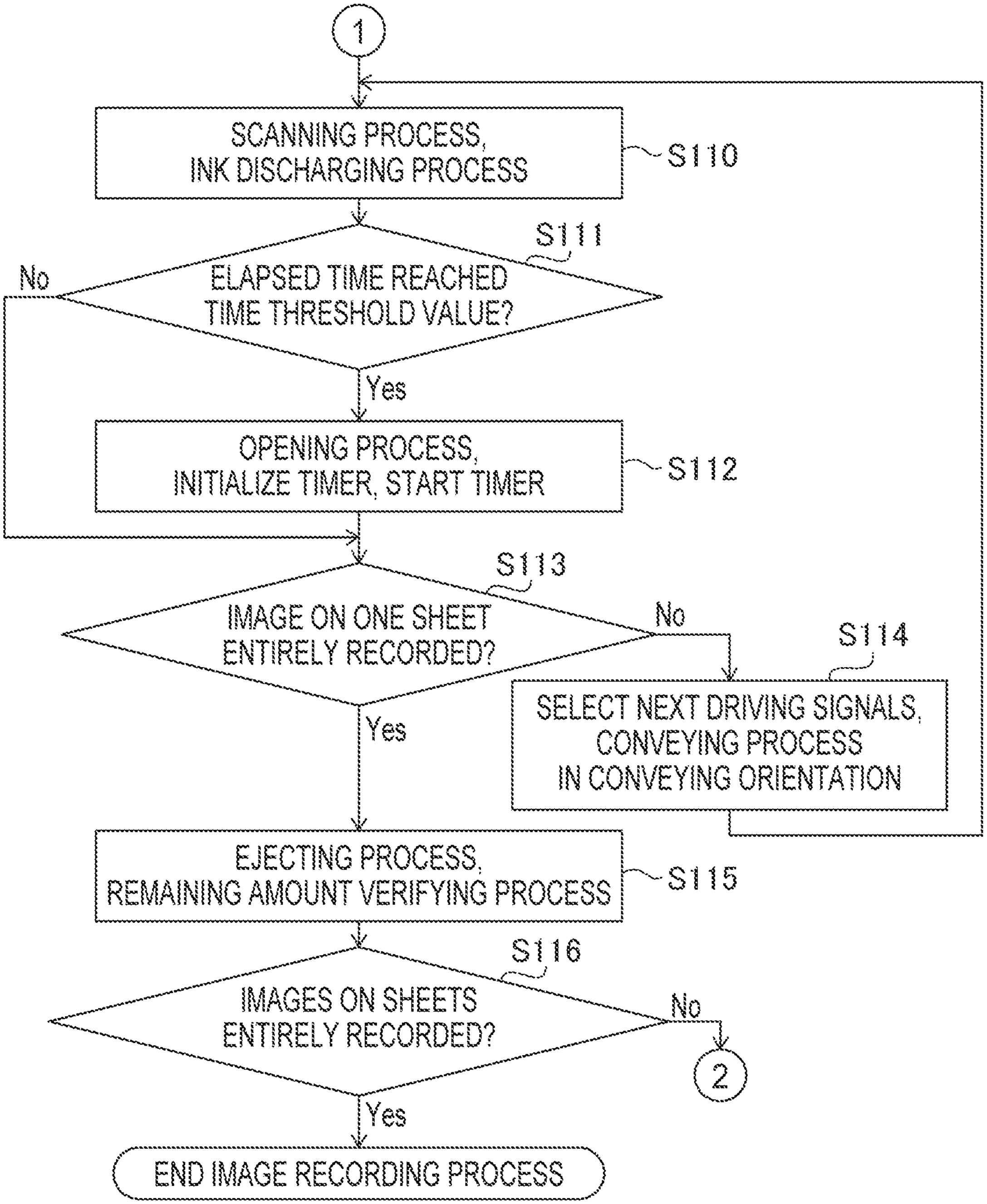

FIGS. 9A-9B are flowcharts to illustrate steps in an image recording process to be conducted in the printer 100 according to the embodiment of the present disclosure.

FIG. 10A is an illustrative view of a guidance image 510 to be displayed in the printer 100 according to the embodiment of the present disclosure. FIG. 10B is an illustrative view of an inner communication path 220E in a first example modified from the embodiment of the present disclosure. FIG. 10C is an illustrative view of an inner communication path 220E in a first example modified from the embodiment of the present disclosure.

Figure 11:
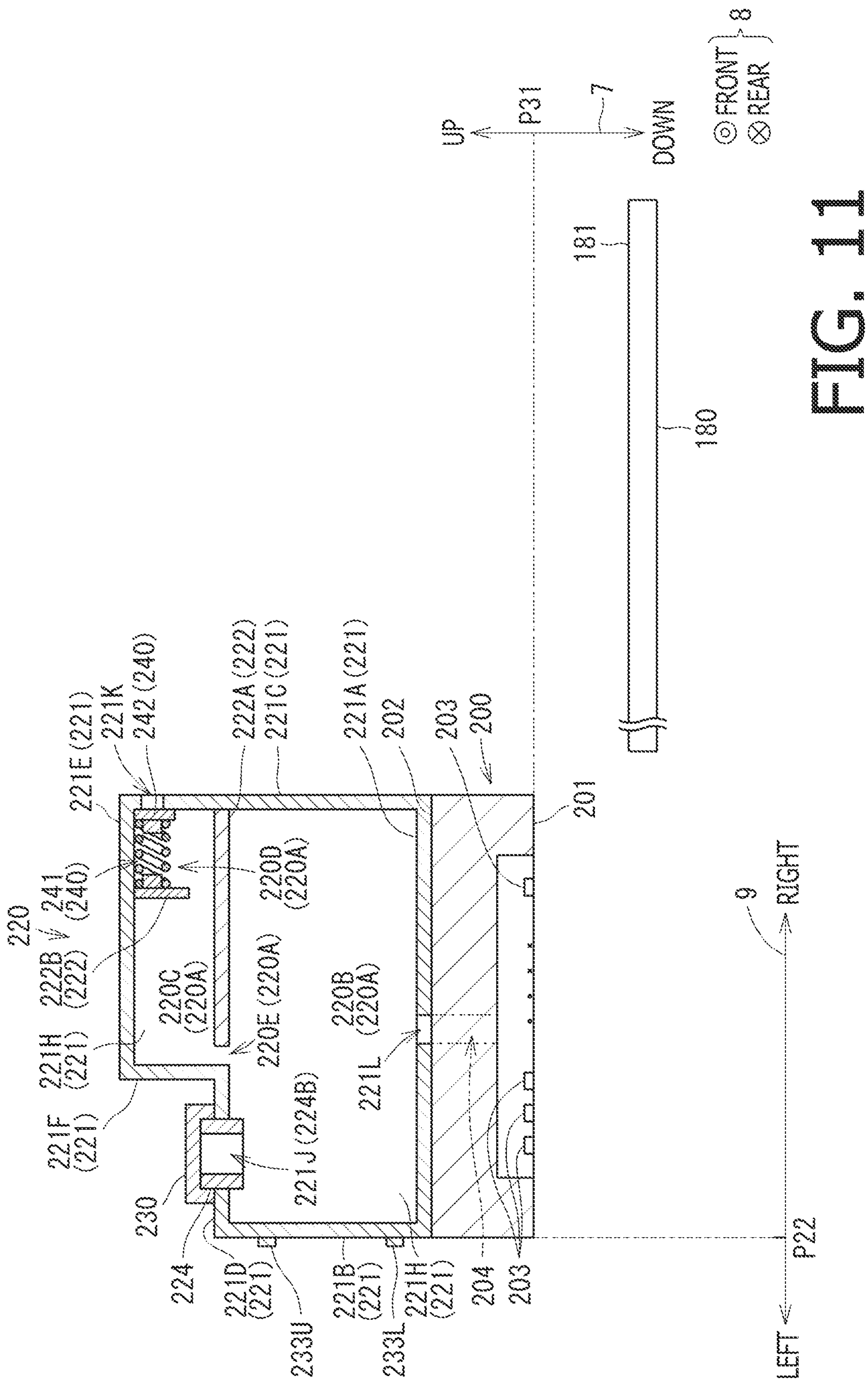

FIG. 11 is an illustrative view of the valve unit 240 after a second closing process, with the valve body 242 closing the atmosphere communication path 221, in the printer according to the embodiment of the present disclosure.

Figure 12A:
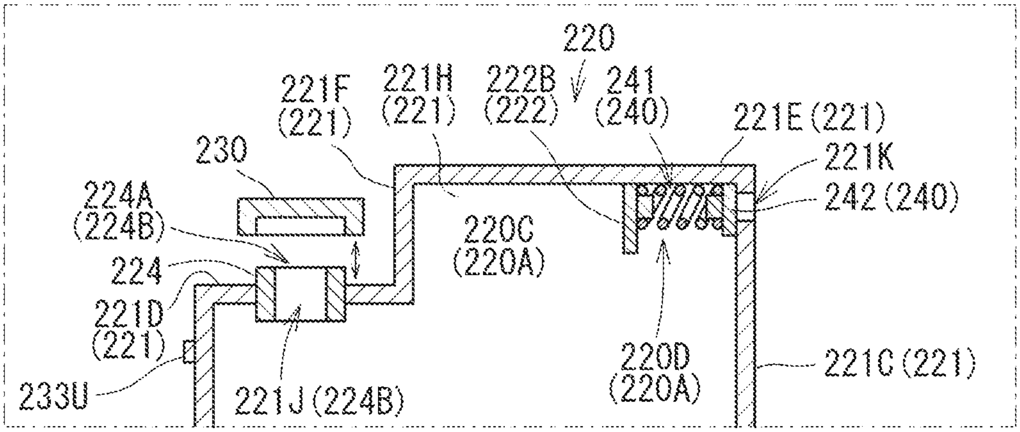
Figure 12B:
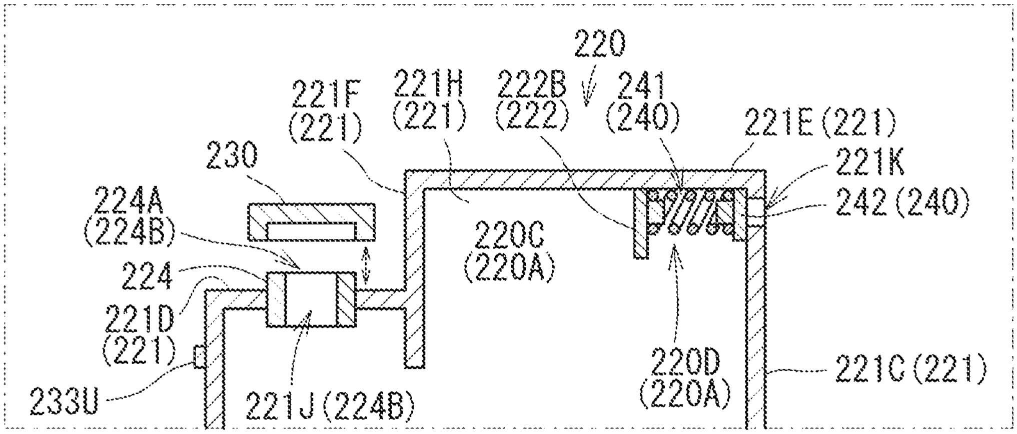
Figure 12C:
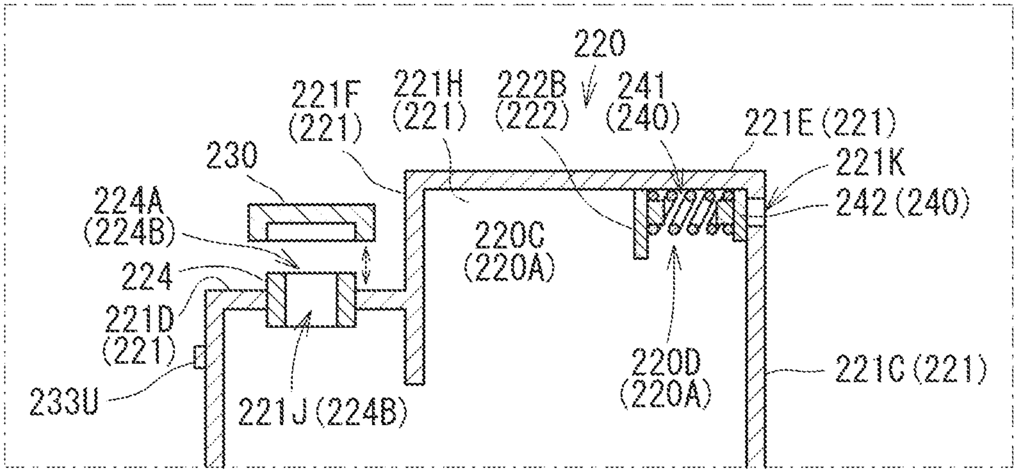

FIGS. 12A-12C are modified examples of the reservoir section 220 in the printer 200 according to the embodiment of the present disclosure.

Figure 13A:
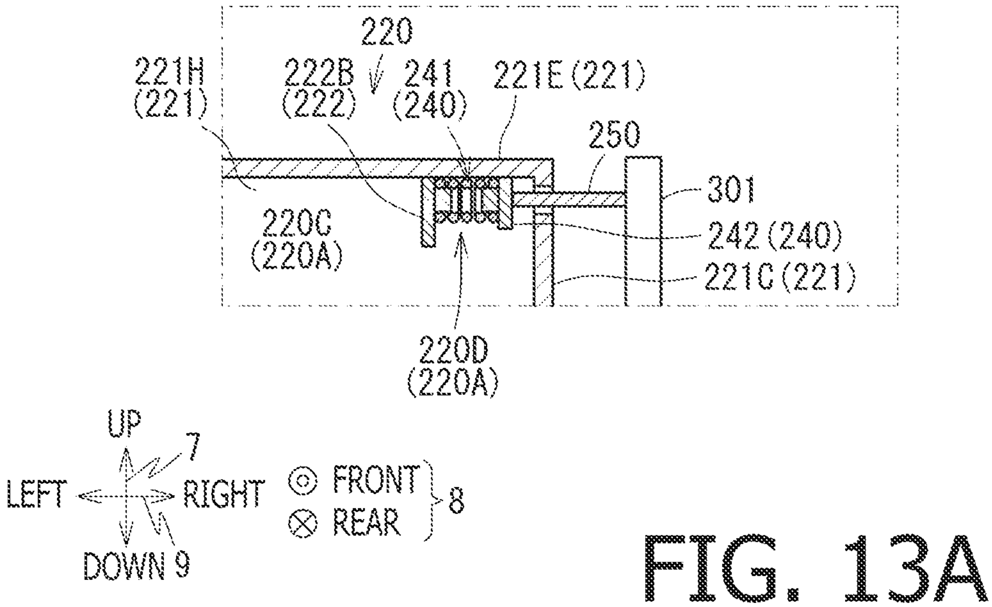
Figure 13B:
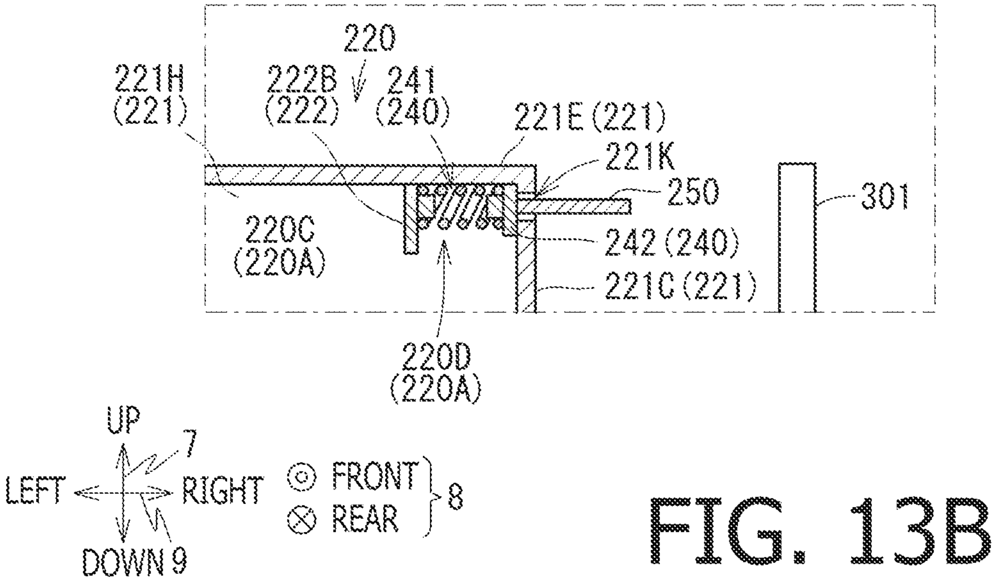

FIGS. 13A-13B are illustrative views of an opener member 250, opening and closing the atmosphere communication path 221K, respectively, in a modified example according to the embodiment of the present disclosure.

DETAILED DESCRIPTION

Embodiment

In the following paragraphs, with reference to the accompanying drawings, an embodiment of the present disclosure will be described. It is noted that various connections may be set forth between elements in the following description. These connections in general and, unless specified otherwise, may be direct or indirect and that this specification is not intended to be limiting in this respect.

In the following description, directivity indicated by a pointing arrow, from a root of a stem toward a pointing head, will be expressed by a term "orientation," whereas back or forth movability along a line extending through a stem and a pointing head of an arrow will be expressed by a term "direction."

Figure 1:
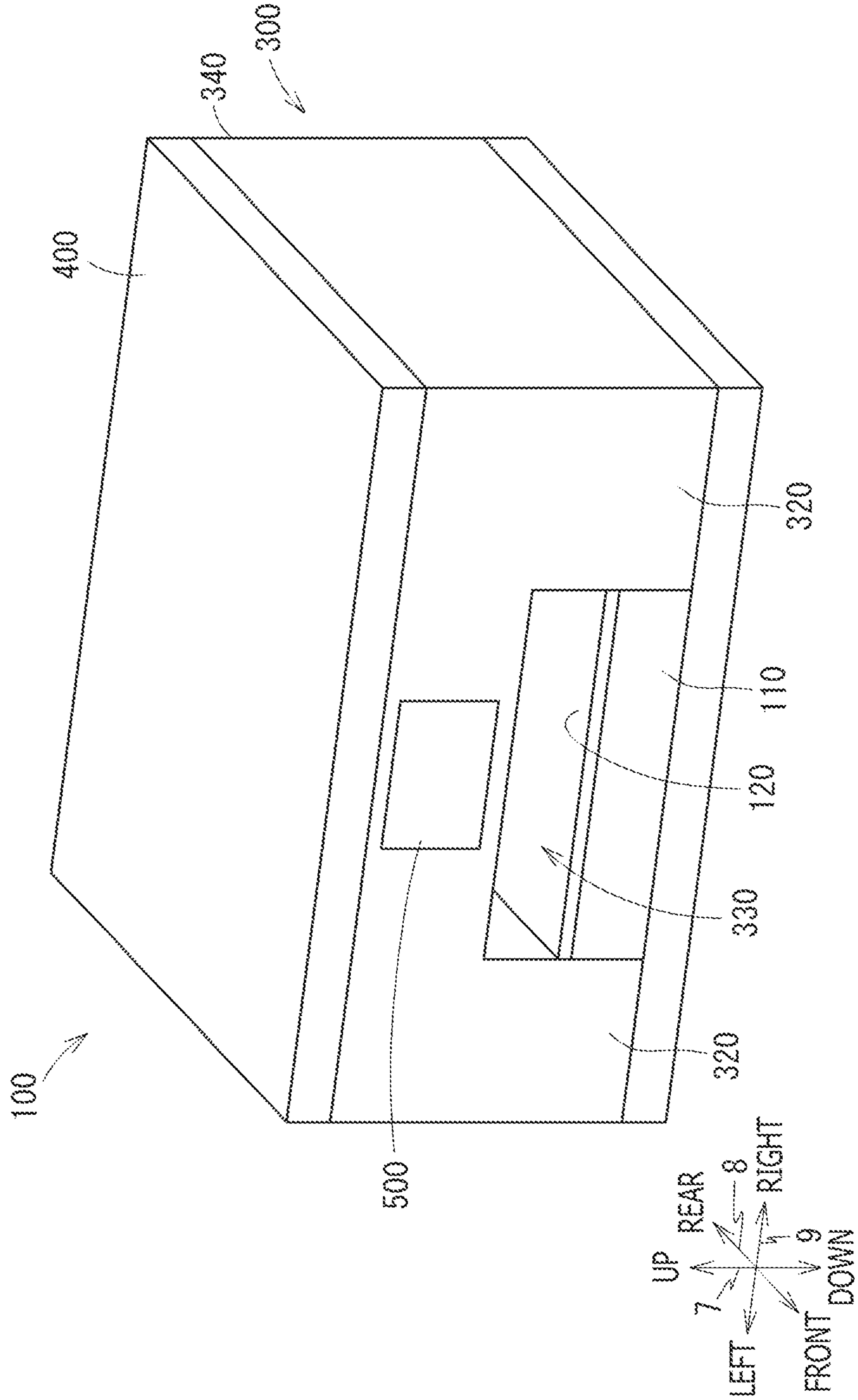
FIG. 1 is an exterior perspective view of a printer 100 according to an embodiment of the present disclosure.

Moreover, positional relation within the printer 100 and each part or item included in the printer 100 will be mentioned on basis of a posture of the printer 100 in an ordinarily usable condition as indicated by the bi-directionally pointing arrows in FIG. 1. For example, a vertical axis between an upper side and a lower side in FIG. 1 is defined as an up-down direction 7. A side, on which an opening 330 is formed, is defined as a front face 320, and an axis between the front side and a rear side opposite from the front side is defined as a front-rear direction 8. A right-hand side and a left-hand side to a user who faces the front face 320 of the printer 100 are defined as a rightward side and a leftward side, respectively. An axis between the rightward side and the leftward side is defined as a right-left direction 9. The up-down direction 7, the front-rear direction 8, and the right-left direction 9 intersect orthogonally to one another. In the following description, the up-down direction 7 and the right-left direction 9 may be referred to as a vertical direction 7 and a widthwise direction 9, respectively.

[Overall Configuration of Printer 100]

The printer 100 as shown in FIG. 1 may record a monochrome image in a single color, e.g., black, on a sheet M (see FIG. 2) in an inkjet recording method. The sheet M may be, for example, a sheet of paper or an OHP film. It may be noted, however, that the method to record the image on the sheet M may not necessarily be limited to inkjet recording but may be in a different recording method such as, for example, thermal-inkjet recording, which is also known as bubblejet (registered trademark) recording.

The printer 100 has a housing 300, a cover 400, and a user interface (UI) 500.

[Housing 300]

Figure 2:
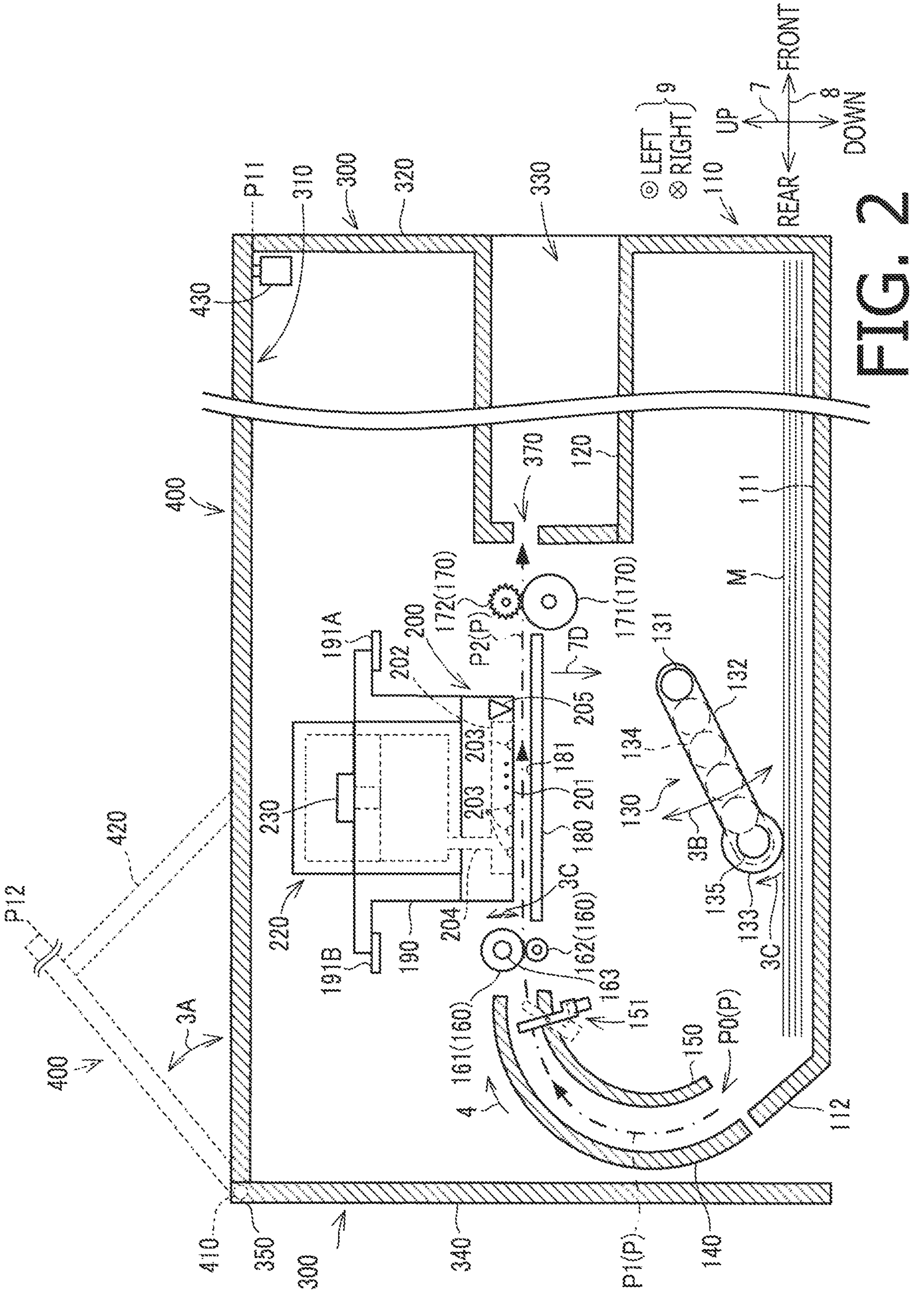
FIG. 2 is a cross-sectional view to illustrate an inner structure of the printer 100 according to the embodiment of the present disclosure.

The housing 300 may have a shape of an approximately rectangular cuboid. As shown in FIG. 2, an upper end of the housing 300 forms an opening 310. In other words, the housing 300 is open upward at the upper end thereof. The housing 300 may be supported by frames, which are not shown, arranged in the printer 100.

As shown in FIG. 2, the housing 300 has the front face 320, a rear face 340, and a pair of bearings 350, although solely one of which is shown in FIG. 2. On the front face 320, the opening 330 being open frontward is formed. The paired bearings 350 are located at an upper end of the rear face 340 and separated in the widthwise direction 9. In each bearing 350, a shaft hole elongated in the widthwise direction 9 is formed.

[Cover 400]

As shown in FIG. 1, the cover 400 may have a shape of an approximately rectangular short cuboid. As shown in FIG. 2, the cover has a pair of shafts 410, although solely one of which is shown in FIG. 2. The paired shafts 410 are located at a rear end of the cover 400 and separated in the widthwise direction 9. One of the shafts 410 on the left and the other of the shafts 410 on the right are inserted in one of the bearings 350 on the left and the other of the bearings 350 on the right, respectively.

A frontward part of the cover 400 may be moved by a user to pivot in a circumferential direction 3A of the shafts 410. A lower-limit position P11 being a lowermost position to the frontward part of the cover 400 in a pivotable range may be delimited by the upper end of the housing 300. An upper-limit position P12 being an uppermost position to the frontward part of the cover 400 in the pivotable range may be delimited by a length of an arm 420 connecting the housing 300 and the cover 400. When the frontward part is at the lower-limit position P11, the cover 400 may close the opening 310 and conceal an inner structure, including a reservoir section 220, arranged inside the housing 300. When the frontward part of the cover 400 is at the upper-limit position P12, on the other hand, the cover 400 may expose the opening 310 and reveal the inner structure including the reservoir section 220 externally.

[Cover Sensor 430]

As shown in FIG. 2, the printer 100 has a cover sensor 430 arranged at a position in proximity to the upper end and the front face 320 of the housing 300. The cover sensor 430 may be, for example, a photo-interrupter or, for another example, a pressure sensor. The cover sensor 430 may output different-leveled signals depending on an open/closed condition of the cover 400 to a controller 270 (see FIG. 7). The different-leveled signals from the cover sensor 430 may be hereinafter called as cover signals V11.

[UI 500]

As shown in FIG. 1, the UI 500 is arranged in an upper area on the front face 320. The UI 500 may include a display and operation buttons, which may be operated by a user. The display may display various types of images, including a software button which is a form of an operation button.

[Internal Configuration of Printer 100]

As shown in FIGS. 2-5, the printer 100 has a feeder tray 110, an ejection tray 120, a feeder 130, an outer guide 140, an inner guide 150, a conveyer roller pair 160, an ejection roller pair 170, a platen 180, a carriage 190, a head 200, a conveyer 210, the reservoir section 220, a lid 230, a valve unit 240, an opener member 250, a cap 260, and the controller 270 (see FIG. 7), which are accommodated in the housing 300.

[Feeder Tray 110]

The feeder tray 110 as shown in FIG. 2 may be installed in the housing 300 through the opening 330. On a bottom 111 of the feeder tray 110, one or more sheets M may be stacked in the vertical direction 7. From a rear end of the bottom 111, a guide member 112 extends upper-rearward to a position closely below a lower end of the outer guide 140.

[Ejection Tray 120]

In the housing 300, at a position above the feeder tray 110, a sheet outlet 370 is formed. Through the sheet outlet 370, the sheet M, on which an image is recorded through a liquid-discharging action by the printer 100, may be ejected. The sheet M with the image recorded thereon may be called as a printed material M. The ejection tray 120 is arranged at a lower-frontward position with respect to the sheet outlet 370. The ejection tray 120 may support the printed material M.

[Feeder 130]

The feeder 130 includes a shaft 131, a feeder arm 132, a feeder roller 133, and a driving-force transmission assembly 134.

The shaft 131 is supported by a frame, which is not shown, and extends in the widthwise direction 9 at a position above the bottom 111. The feeder arm 132 is supported by the shaft 131 at a basal end part thereof. The feeder arm 132 is pivotable in a circumferential direction 3B of an axis of the shaft 131. The feeder arm 132 extends lower-rearward from the basal end part. The feeder roller 133 is attached to a tip end part of the feeder arm 132. The feeder roller 133 is rotatable in a circumferential direction 3C of a shaft 135, which is parallel to the shaft 131. The driving-force transmission assembly 134 may include a gear train and a driving belt and may be arranged inside the feeder arm 132.

Overall behaviors of the feeder 130 are herein described. The feeder roller 133 may contact an uppermost one of the sheets M stacked on the bottom 111 of the feeder tray 110. The driving-force transmission assembly 134 may transmit a force, generated by a feeder motor 271 (see FIG. 7) for feeding the sheets M, to the feeder roller 133. The feeder roller 133 may be rotated by the transmitted force and apply a rearward conveying force to the uppermost sheet M. Thereby, the uppermost sheet M may be conveyed rearward on the bottom 111 and guided by an inclined surface of the guide member 112 to a conveyer path P through a sheet inlet P0.

[Conveyer Path P]

As shown in FIG. 2, inside the housing 300, the conveyer path P to convey the sheet M is formed. The sheet inlet P0 forms an upstream end of the conveyer path P and is arranged immediately above the extended end of the guide member 112. The conveyer path P is a so-called U-turn path and includes a curved path P1 and a linear path P2. The curved path P1 curves substantially upper-frontward from the sheet inlet P0. The linear path P2 extends substantially linearly frontward from a downstream end of the curved path P1 to the sheet outlet 370.

[Outer Guide 140, Inner Guide 150]

The outer guide 140 and the inner guide 150 delimit an outermost part and an innermost part of the curved path P1, respectively.

Conveyance of the sheet M is herein described. The sheet M fed to the sheet inlet P0 may be guided by the outer guide 140 and the inner guide 150 to be conveyed in the curved path P1. Thereafter, the sheet M may be passed to the conveyer roller pair 160.

[Registration Sensor 151]

On the inner guide 150 at a registration position, which is in proximity to a downstream end of the curved path P1, a registration sensor 151 is arranged. The registration sensor 151 is supported by the inner guide 150 and extends inside the curved path P1. The registration sensor 151 may swing in a conveying orientation 4, which is an orientation of the sheet M being conveyed in the curved path P1, and in a reverse orientation. The sheet M being conveyed in the curved path P1 may contact the registration sensor 151. The registration sensor 151 may output different-leveled signals depending on whether the sheet M is in contact with the registration sensor 151 or the sheet M is not in contact with the registration sensor 151 to the controller 270 (see FIG. 7). The different-leveled signals from the registration sensor 151 may be hereinafter called as registration signals V13.

[Conveyer Roller Pair 160]

As shown in FIG. 2, the conveyer roller pair 160 includes a driving roller 161 and a pinch roller 162. The driving roller 161 and the pinch roller 162 are arranged to contact each other in the vertical direction 7 across a downstream end part of the curved path P1 and extend in the widthwise direction 9 along the downstream end part of the curved path P1. The driving roller 161 in the present embodiment contacts the pinch roller 162 from above. Optionally, however, the driving roller 161 may contact the pinch roller 162 from below.

The driving roller 161 may rotate by a force generated by a conveyer motor 272 (see FIG. 7) for conveying the sheets M. The pinch roller 162 may be rotated by the rotation of the driving roller 161. The driving roller 161 and the pinch roller 162 may nip the sheet M and rotate to convey the sheet M in a conveying orientation 4, e.g., frontward. Thereby, the sheet M may be conveyed downstream in the linear path P2.

[Ejection Roller Pair 170]

As shown in FIG. 2, the ejection roller pair 170 includes a driving roller 171 and a spur roller 172. The driving roller 171 and the spur roller 172 are arranged to contact each other in the vertical direction 7 between the platen 180 and the sheet outlet 370 in the linear path P2 across the linear path P2 and extend in the widthwise direction 9 along the linear path P2. The spur roller 172 in the present embodiment contacts the driving roller 171 from above. Optionally, however, the spur roller 172 may contact the driving roller 171 from below.

The driving roller 171 may rotate by the force generated by the conveyer motor 272. The spur roller 172 may be rotated by the rotation of the driving roller 171. The driving roller 171 and the spur roller 172 may nip the sheet M and rotate to convey the sheet M further downstream in the conveying orientation 4. Thereby, the sheet M may be ejected outside through the sheet outlet 370.

[Platen 180]

The platen 180 is located between the conveyer roller pair 160 and the ejection roller pair 170 in the front-rear direction 8. The platen 180 has a supporting surface 181 spreading in the front-rear direction 8 and the widthwise direction 9. The supporting surface 181 delimits a lowermost part of the linear path P2 and may support the sheet M from below. The supporting surface 181 may be formed of upper-end faces of a plurality of ribs protruding upward from the platen 180 and longitudinally extending in the front-rear direction 8. Optionally, however, the supporting surface 181 may be a plain upper surface of the platen 180. The platen 180 may be colored in, for example, black, or a color which may absorb light emitted from the sheet sensor 205.

Figure 3:
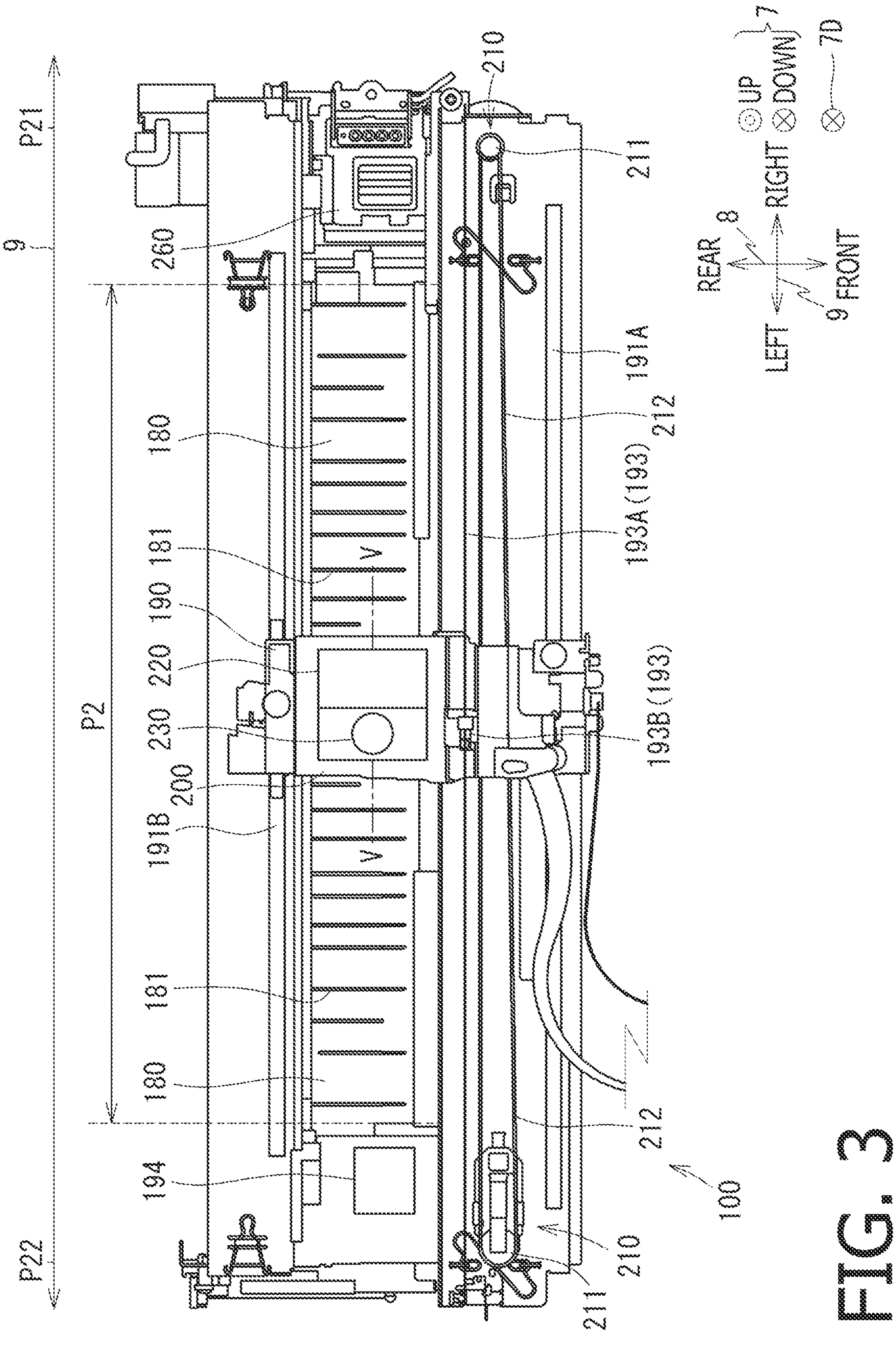
FIG. 3 is a top plan view showing the inner structure of the printer 100 with a cover 400 being open according to the embodiment of the present disclosure.

As shown in FIGS. 2-3, the supporting surface 181 may be exposed outside the housing 300 when the cover 400 (see FIG. 2) is opened by the user. With the cover 400 being open, the user may remove the sheet M jammed in the linear path P2.

[Carriage 190]

The printer 100 further has guide rails 191A, 191B arranged inside the housing 300. As shown in FIG. 2, the guide rails 191A, 191B are located at positions higher than the supporting surface 181 and are supported by a frame, which is not shown. In a top plan view, as shown in FIG. 3, the guide rails 191A, 191B are arranged to be spaced apart in the front-rear direction 8 to flank the supporting surface 181 and longitudinally extend in the widthwise direction 9. In other words, between the guide rails 191A, 191B in the front-rear direction 8, the supporting surface 181 of the platen 180 is located.

The carriage 190, as shown in FIG. 3, has a width smaller than a width of the platen 180 and is arranged over the guide rails 191A, 191B in the front-rear direction 8. The carriage 190, together with the head 200 and the ink reservoir section 220, may move on the guide rails 191A, 191B by the force transmitted through the conveyer 210 to reciprocate in the widthwise direction 9.

[Head 200]

As shown in FIG. 2, the head 200 has a lower face 201, an upper face 202, a plurality of nozzles 203, and an ink flow path 204. The plurality of nozzles 203 are formed to align along the front-rear direction 8 and the widthwise direction 9 on the lower face 201. In FIG. 2, among the plurality of nozzles 203, merely nozzles 203 aligning along the front-rear direction 8 are shown. The nozzles 203 are open downward. The head 200 is mounted on the carriage 190 so that the lower face 201 may move in the widthwise direction 9 along with the carriage 190 in a position separated above from the supporting surface 181. In this regard, the lower face 201 delimits an uppermost part of the linear path P2.

The head 200 accommodates piezoelectric devices (not shown), which correspond to the nozzles 203 on one-to-one basis. Driving waveforms modulated by the controller 270 may be applied to the piezoelectric devices, and thereby the head 200 may discharge the ink and consume the ink stored therein through the nozzles 203 in a discharging orientation 7D, i.e., downward.

[Conveyer 210]

The conveyer 210 as shown in FIG. 3 includes two (2) pulleys 211 and an endless belt 212. The conveyer 210 forms a part of a switching assembly and may switch states of a valve body 242, which will be described further below, between an opening state and a closing state. The pulleys 211 are separated on the guide rail 191A from each other in the widthwise direction 9. Each pulley 211 may rotate in a circumferential direction of an axis thereof, which extends along the vertical direction 7. The endless belt 212 is strained around the pulleys 211 and is coupled to the carriage 190. One of the pulleys 211, e.g., the pulley 211 on the right, is coupled to a carriage motor 273 (see FIG. 7) for driving the carriage 190. The carriage motor 273 may operate under control of the controller 270 and generate a driving force. The pulley 211 on the right may be driven by the driving force from the carriage motor 273 to rotate in either a normal direction or a reverse direction. Therefore, the head 200 coupled to the endless belt 212 may reciprocate in the widthwise direction 9 between a capped position P21 and an injection position P22, which are set in advance between the pulleys 211. The capped position P21 is at substantially the same position in the widthwise direction 9 as the cap 260, which is separated rightward from the platen 180 and leftward from a frame 301 (see FIG. 5). The injection position P22 is separated leftward from the platen 180. In the present embodiment, the injection position P22 coincides with a flushing position, in which the head 200 is located during a flushing process described further below. Therefore, in the description below, the injection position P22 may be occasionally called as a flushing position P22. When the injection position P22 coincides with the flushing position, an ink receiver 194 may be arranged at the injection position P22.

The head 200 may move above an ink dischargeable range R11 (see FIG. 8), which will be described further below, while the carriage 190 moves leftward or rightward in a swath or a pass under the control of the controller 270. The head 200 and an ink reservoir chamber 220B are connected through the ink flow path 204 allowing the liquid to flow therein. While moving in the widthwise direction 9, the head 200 may discharge the ink supplied through the ink flow path 204 from the reservoir section 220. In other words, a line of image for a pass may be recorded on the sheet M.

[Linear Encoder 193]

As shown in FIG. 3, a linear encoder 193 is arranged on the guide rail 191A and the carriage 190. The linear encoder 193 includes an encoder strip 193A and an optical sensor 193B. The encoder strip 193A is arranged on the guide rail 191A between the endless belt 212 and the platen 180 in the front-rear direction 8. The encoder strip 193A extends in the widthwise direction 9 between the capped position P21 and the injection position P22. The encoder strip 193A thereon has a pattern, in which light-transmissive portions that transmit light and light-blocking portions that block light are alternately arranged at equal intervals along the widthwise direction 9. The optical sensor 193B has a light-emitting device and a light-receiving device, which are arranged to face each other across the encoder strip 193A. The light-emitting device may emit light at the encoder strip 193A while the carriage 190 is being moved. The light-receiving device may receive the light from the light-emitting device and output different-leveled signals depending on an amount of the received light to the controller 270. The different-leveled signals from the linear encoder 193 may be hereinafter called as position signals V15 (see FIG. 7).

[Sheet Sensor 205]

As shown in FIG. 2, on the lower face 201 of the head 200, a sheet sensor 205 is arranged. In particular, the sheet sensor 205 may be arranged at a position on the linear path P2 in proximity to a front end of the lower face 201. The sheet sensor 205 being an optical sensor is arranged to face the supporting surface 181 of the platen 180. The sheet sensor 205 has a light-emitting device and a light-receiving device. The light-emitting device may emit a predetermined amount of light downward at the supporting surface 181 while the head 200 is being moved. The light-receiving device may output different-leveled signals depending on an amount of received light to the controller 270. The different-leveled signals from the sheet sensor 205 may be hereinafter called as sheet signals V16 (see FIG. 7). In the present embodiment, when the light is emitted from the light-emitting device of the sheet sensor 205 at the sheet M on the platen 180, the light may be reflected on the sheet M, and a part of the reflected light may enter the light-receiving device. On the other hand, when the light is emitted from the light-emitting device of the sheet sensor 205 at the platen 180, the light may be absorbed in the platen 180. Thus, the sheet signals V16 may indicate presence or absence of the sheet M on the supporting surface 181 at the position straight below the sheet sensor 205.

[Reservoir Section 220, Lid 230]

Figure 4:
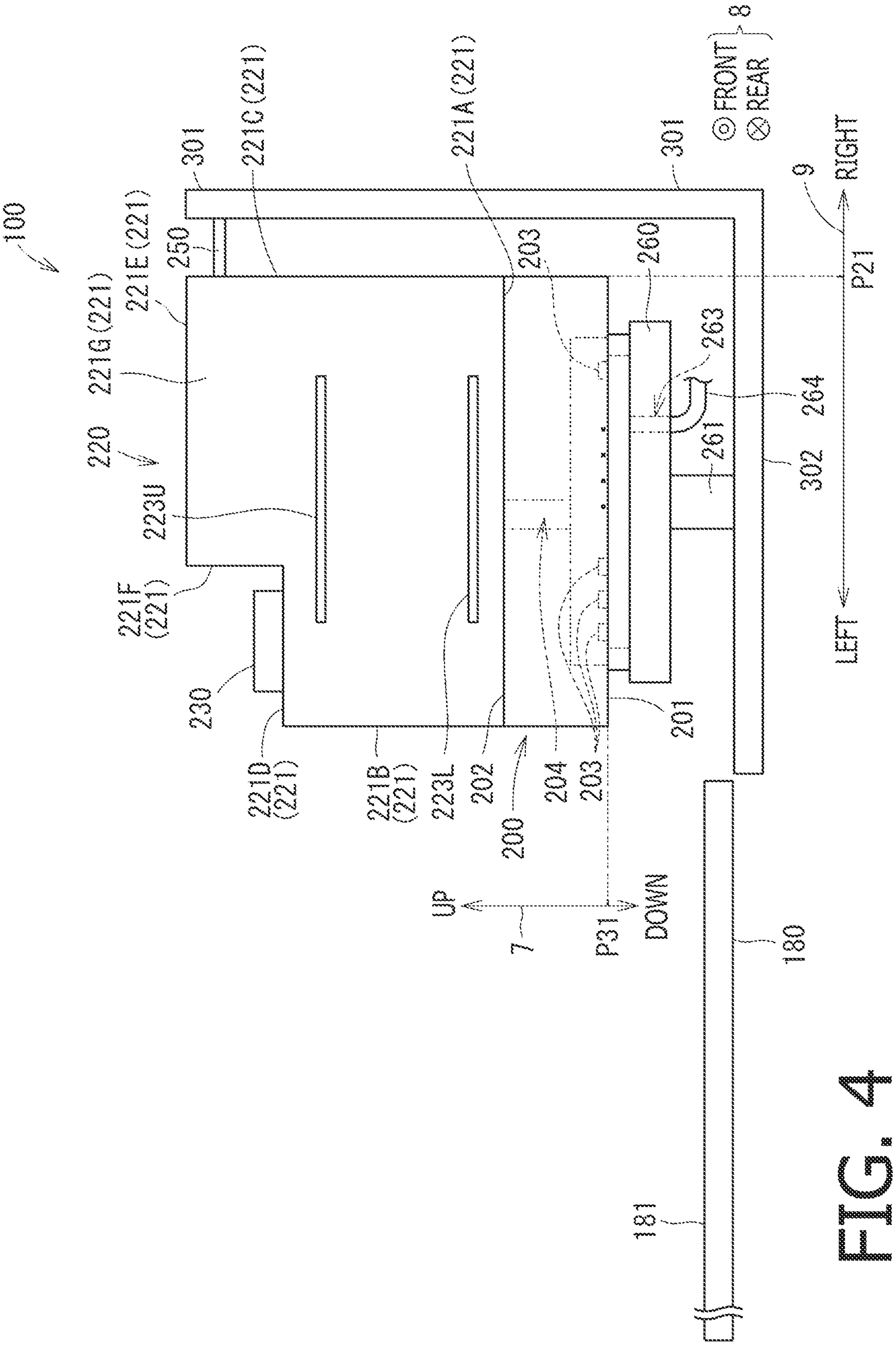
FIG. 4 is an illustrative view of a reservoir section 220 and a neighboring structure shown in FIG. 3, viewed from a front side, according to the embodiment of the present disclosure.
Figure 5:
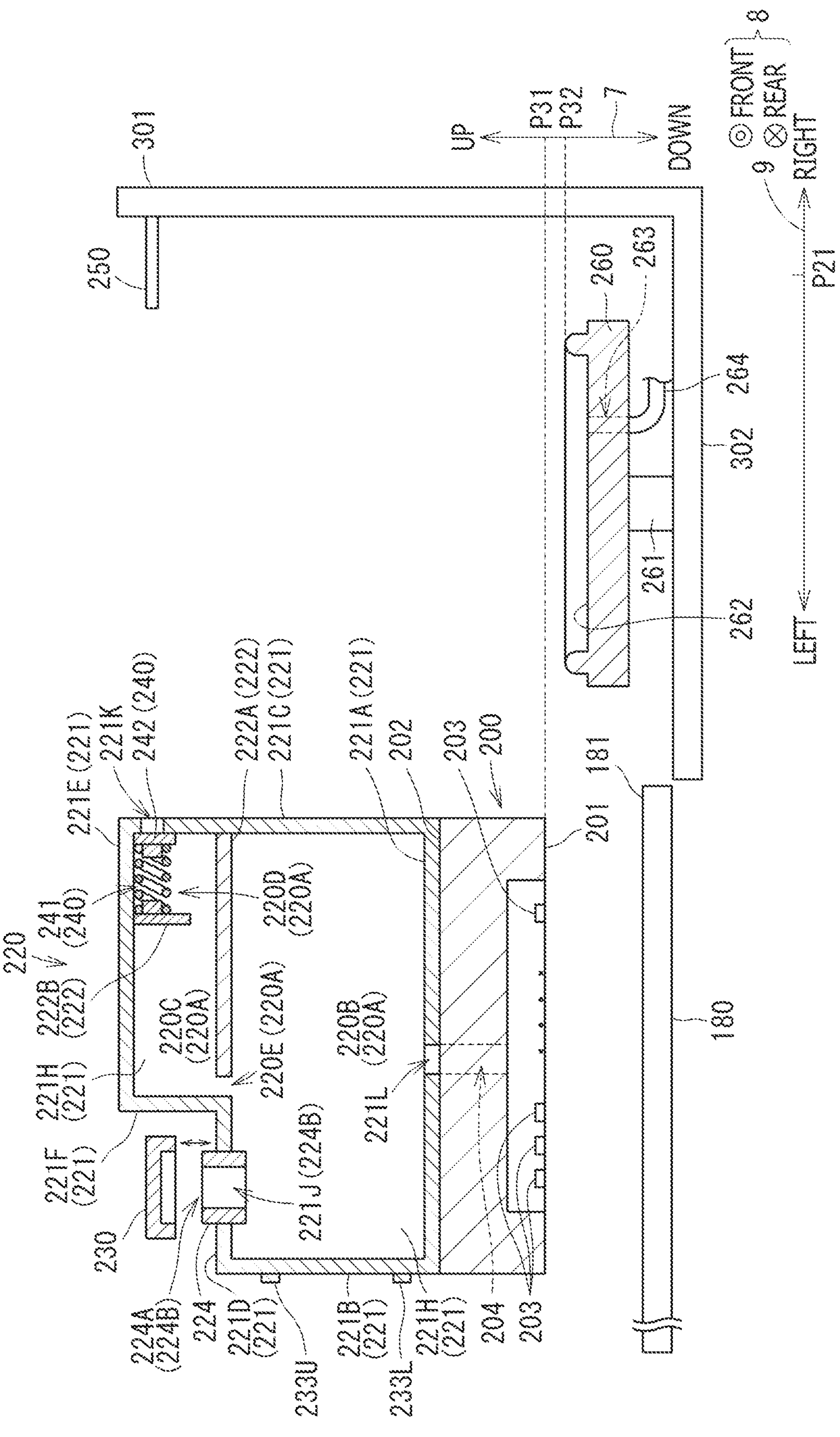
FIG. 5 is a cross-sectional view of the reservoir section 220 and the neighboring structure, sectioned at a dash-and-dot line V-V indicated in FIG. 3 and viewed from the front side, according to the embodiment of the present disclosure.

The reservoir section 220, as shown in FIGS. 4-5, being an ink tank is attached to the upper face 202 of the head 200 so that the reservoir section 220 may not be detached from the head 200 easily. In other words, the printer 100 in the present embodiment may be a so-called on-carriage printer, in which the reservoir section 220 and the head 200 are mounted on the carriage 190. The reservoir section 220 may be located entirely at an upper position with respect to the head 200. Optionally, however, the reservoir section 220 may be at least partly located above the upper face 202 of the head 200, and another part of the reservoir section 220 may be located below the upper face 202 of the head 200.

The reservoir section 220 may store ink therein. A color of the ink may be, for example, black. The ink in the reservoir section 220 may be supplied to the head 200 through an outflow port 221L and the ink flow path 204. The reservoir section 220 has, as shown in FIG. 4, an outer wall 221, an upper index 223U, and a lower index 223L. Moreover, the reservoir section 220 has, as shown in FIG. 5, a plurality of divider walls 222 and a cylindrical wall 224.

As shown in FIG. 5, the outer wall 221 delimits an inner space 220A of the reservoir section 220 from an external surrounding. The reservoir section 220 may be mainly made of a translucent material, e.g., transparent resin. Therefore, a user may visually recognize an amount of the ink stored in the reservoir section 220.

The outer wall 221 includes a bottom wall 221A, a first left-side wall 221B, a right-side wall 221C, a first upper wall 221D, a second upper wall 221E, a second left-side wall 221F, a front wall 221G (see FIG. 4), and a rear wall 221H (see FIG. 5). The first upper wall 221D and the second upper wall 221E are in substantially rectangular forms in a plan view along the vertical direction 7. The first left-side wall 221B, the second left-side wall 221F, and the right-side wall 221C are substantially in rectangular forms in a view along the widthwise direction 9.

The bottom wall 221A spreads on the upper face 202 of the head 200. A frontward edge and a rearward edge of the bottom wall 221A are substantially parallel to the front-rear direction 8, and a leftward edge and a rightward edge of the bottom wall 221A are substantially parallel to the widthwise direction 9.

The first left-side wall 221B and the right-side wall 221C extend upward from the leftward edge and the rightward edge of the bottom wall 221A, respectively. An extended end, i.e., an upper end, of the first left-side wall 221B is located to be lower than an extended end of the right-side wall 221C.

The first upper wall 221D spreads between the upper end of the first left-side wall 221B and an intermediate position, which is between the first left-side wall 221B and the right-side wall 221C. The second upper wall 221E spreads between an upper end of the right-side wall 221C and a position above an extended end, or a rightward end, of the first upper wall 221D.

As shown in FIG. 5, in the first upper wall 221D, a through hole 221J, through which the ink may be injected into the reservoir section 220, is formed through the first upper wall 221D in the vertical direction 7.

As shown in FIGS. 4-5, the second left-side wall 221F spreads between a rightward edge of the first upper wall 221D and a leftward edge of the second upper wall 221E.

The front wall 221G (see FIG. 4) and the rear wall 221H (see FIG. 5) close the front end and the rear end of the reservoir section 220, respectively.

As shown in FIG. 5, the plurality of divider walls 222 at least includes a crosswise divider wall 222A and a vertical divider wall 222B, which, together with the outer wall 221, divide the inner space 220A into the ink reservoir chamber 220B, an air chamber 220C, and a valve placement space 220D.

The crosswise divider wall 222A is separated below from the vertical divider wall 222B and above from the upper index 223U. The crosswise divider wall 222A is located between a position, which is separated rightward from the rightward edge of the upper wall 221D, and the right-side wall 221C. The crosswise divider wall 222A spreads in the front-rear direction 8 and the widthwise direction 9 substantially in parallel with the second upper wall 221E. A frontward edge and a rearward edge of the crosswise divider wall 222A are continuous with the front wall 221G and the rear wall 221H, respectively.

Optionally, however, the crosswise divider wall 222A may not necessarily spread in parallel the second upper wall 221E, or the frontward edge and the rearward edge of the crosswise divider wall 222A may not necessarily be continuous with the front wall 221G and the rear wall 221H, respectively.

The vertical divider wall 222B spreads in the vertical direction 7 and the front-rear direction 8 between a position leftward from the right-side wall 221C and a position above the crosswise divider wall 222A.

The ink reservoir chamber 220B is a space enclosed by the bottom wall 221A, the first left-side wall 221B, the right-side wall 221C, the first upper wall 221D, the front wall 221G, the rear wall 221H, and the crosswise divider wall 222A. The ink reservoir chamber 220B may store the ink.

The air chamber 220C is enclosed by the right-side wall 221C, the second upper wall 221E, the second left-side wall 221F, the front wall 221G, the rear wall 221H, and the crosswise divider wall 222A. The air chamber 220C is located at an upper position with respect to the upper index 223U. The air may be drawn into the air chamber 220C. Optionally, the air chamber 220C may be a so-called labyrinth flow path delimited by another divider wall(s).

The valve placement space 220D is a space delimited by the second upper wall 221E, the right-side wall 221C, and the vertical divider wall 222B and accommodates the valve unit 240. A lower side of the valve placement space 220D is open downward. Therefore, an atmosphere communication path 221K is connected with the air chamber 220C through the valve placement space 220D.

As shown in FIG. 4, the upper index 223U is arranged on an outer surface of the front wall 221G at a position in proximity to the upper edge of the front wall 221G and has a linear form extending in the widthwise direction 9. The upper index 223U may be a sign indicating a surface level of a maximum amount of the ink storable in the ink reservoir chamber 220B. Moreover, on an outer surface of the first left-side wall 221B, an upper index 233U may be arranged at the same position in the vertical direction 7 as the upper index 223U.

The lower index 223L is arranged on the outer surface of the front wall 221G at a position in proximity to the lower edge of the front wall 221G and has a linear form extending in the widthwise direction 9. The lower index 223L may be a sign indicating a surface level of the ink, at which the ink reservoir chamber 220B should be refilled with the ink. Moreover, on the outer surface of the first left-side wall 221B, a lower index 233L may be arranged at the same position in the vertical direction as the lower index 223L.

The upper index 223U, the lower index 223L, the upper index 233U, and the lower index 233L may be marked by engraving, embossing, or painting in a colorant.

As shown in FIG. 5, the cylindrical wall 224 cylindrically extends upward and downward from a circumferential edge of the through hole 221J in the first upper wall 221D. The cylindrical wall 224 has an injection port 224A at an upper end thereof. In other words, an upper end of the cylindrical wall 224 forms an injection port 224A. The injection port 224A is an opening open upward, or outward from the reservoir section 220. An inner circumferential surface of the cylindrical wall 224 delimits an ink supplying path 224B, which continues from the injection port 224A through the through hole 221J to the ink reservoir chamber 220B. In other words, the injection port 224A is continuous with the ink reservoir chamber 220B.

The lid 230 shown in FIGS. 4-5 may be formed of, for example, flexible resin. The lid 230 may be attached to and detached from an upper end of the cylindrical wall 224 by the user to close and open the injection port 224A. The lid 230 may deform when being attached to or detached from the cylindrical wall 224 by the user.

As shown in FIG. 5, an inner communication path 220E is a space between the rightward edge of the first upper wall 221D and the leftward edge of the crosswise divider wall 222A. Through the inner communication path 220E, the air chamber 220C and the ink reservoir chamber 220B communicate.

The atmosphere communication path 221K is a through hole formed through the right-side wall 221C in the widthwise direction 9 at a position coincident with the vertical divider wall 222B in the widthwise direction 9. Through the atmosphere communication path 221K, the air chamber 220C and the outside of the reservoir section 220 communicate. The atmosphere communication path 221K is formed at an upper position with respect to the injection port 224A.

A cross-sectional area of the inner communication path 220E along the front-rear direction 8 and the widthwise direction 9 may be preferably smaller than a cross-sectional area of the air chamber 220C along the front-rear direction 8 and the widthwise direction 9. An area of the opening of the inner communication path 220E at the lower edge may be preferably smaller than an area of the opening of the atmosphere communication path 221K. In this arrangement, the air may flow from the atmosphere communication path 221K through the air chamber 220C into the inner communication path 220E smoothly.

The outflow port 221L is a through hole formed vertically through the bottom wall 221A and is continuous with the ink flow path 204. The air chamber 220C is at least partly located at an upper position with respect to the outflow port 221L. In other words, the air chamber 220C may be located to be higher entirely than the outflow port 221L, or at least a part of the air chamber 220C may be located to be higher than the outflow port 221L.

[Liquid Amount Sensor 216]

As shown in FIGS. 6A-6B, the reservoir section 220 further includes a protrusive portion 221M, which protrudes rearward from the rear wall 221H. The protrusive portion 221M is formed of a translucent material and has a shape of an approximately rectangular cuboid. As shown in FIG. 6A, the protrusive portion 221M extends in the vertical direction 7 from a lower position with respect to the lower index 223L to an upper position with respect to the lower index 223L. As shown in FIG. 6B, a width of the protrusive portion 221M in the widthwise direction 9 is smaller than a width of the reservoir section 220 in the widthwise direction 9. The protrusive portion 221M delimits a space, which is continuous with the ink reservoir chamber 220B.

The printer 100 has the liquid amount sensor 216 being an optical sensor. A light-emitting device in the liquid amount sensor 216, arranged on a rightward side of the protrusive portion 221M, may emit light at a position substantially equal to the lower index 223L in the vertical direction 7 in a direction substantially parallel to the widthwise direction 9. A light-receiving device in the liquid amount sensor 216 is arranged on a leftward side of the protrusive portion 221M to face toward the light-emitting device across the protrusive portion 221M and may output different-leveled signals depending on an amount of received light to the controller 270. The different-leveled signals from the liquid amount sensor 216 may be hereinafter called as liquid amount signals V12 (see FIG. 7). In particular, the level of the liquid amount signal V12 when the light-receiving device receives the light transmitted through the protrusive portion 221M and the level of the liquid amount signal V12 when the light-receiving device does not receive the light through the protrusive portion 221M are different.

[Valve Unit 240, Opener Member 250]

As shown in FIG. 5, the valve unit 240 has a spring 241 and the valve body 242.

The spring 241 may be a compressive coil spring, of which natural length is substantially equal to or larger than a distance between the right-side wall 221C and the vertical divider wall 222B in the widthwise direction 9. The spring 241 is accommodated in the valve placement space 220D with an axis thereof aligning in parallel with the widthwise direction 9. A leftward end of the spring 241 is fixed to the vertical divider wall 222B. To a rightward end of the spring 241, the valve body 242 is fixed.

The valve body 242 is located at an upper position with respect to the injection port 224A. The valve body 242 may, when the opener member 250 is not contacting the valve body 242, with an inner surface of the right-side wall 221C serving as a valve seat, close the atmosphere communication path 221K by an urging force of the spring 241.

A frame 301, as shown in FIGS. 4-5, is arranged inside the housing 300. The frame 301 extends in the vertical direction 7 at a rightward position with respect to the cap 260 and faces the right-side wall 221C in the widthwise direction 9. The opener member 250 protrudes leftward from the frame 301 at a position coincident with the atmosphere communication path 221K in the widthwise direction 9 (see FIG. 5). A cross-sectional area of the opener member 250 at a section along the vertical direction 7 and the front-rear direction 8 is smaller than the opening of the atmosphere communication path 221K throughout an entire range in the widthwise direction 9. A length of the opener member 250 in the widthwise direction 9 is greater than a distance between the valve body 242 when the head 200 is at the capped position P21 and the frame 301. When the carriage 190 moves in the widthwise direction 9, and shortly before the head 200 on the carriage 190 reaches the capped position P21, a protrusive end of the opener member 250 may enter the atmosphere communication path 221K and contact the valve body 242. While the head 200 stays in the capped position P21, the valve body 242 is separated from the right-side wall 221C by a contacting force from the opener member 250 against the urging force of the spring 241. Therefore, the valve body 242 may open the atmosphere communication path 221K. In other words, the opener member 250 may switch the valve body 242 from the closing state to the opening state. Thus, the valve body 242 may switchably open and close the atmosphere communication path 221K. The opener member 250 forms another part of the switching assembly.

[Cap 260]

As shown in FIGS. 4-5, the cap 260 is located at a position substantially same as the head 200 in the front-rear direction 8 and has an approximately rectangular-boxed shape in a top plan view. An upper end of the cap 260 is open upward. The cap 260 may be formed of an elastic material such as rubber.

The cap 260 is supported by a frame 302, which spreads in the front-rear direction 8 and the widthwise direction 9, through a lift assembly 261. The lift assembly 261 may move the cap 260 vertically between a capping position P31 and an uncapping position P32 by a driving force generated under control of the controller 270 by a lift motor 274 (see FIG. 7). The capping position P31 is a position, at which the upper end of the cap 260 contacts the lower face 201 of the head 200 being located at the capped position P21. The cap 260 at the capping position P31 may cover the nozzles 203 formed in the lower face 201 of the head 200. The uncapping position P32 is lower than the capping position P31 and is a position, at which the upper end of the cap 260 is separated from the lower face 201 of the head 200.

On a bottom 262 (see FIG. 5) of the cap 260, a plurality of through holes 263 are formed, although in FIG. 5 solely one of the plurality of through holes 263 is shown. To each of the through holes 263, a tube 264 is connected at one end so that the through hole 263 and the tube 264 are in fluid communication. The other end of the tube 264 is connected to a pump, which is not shown. The pump may be activated by the controller 270 when the cap 260 is at the capping position P31. Accordingly, obstacles and the ink remaining in the head 200 may be vacuumed and collected on the cap 260. The collected obstacles on the cap 260 may be transported through the tubes 264 to a waste tank, which is not shown.

[Controller 270]

As shown in FIG. 7, the controller 270 includes a CPU, a ROM, a RAM, an EEPROM, and an ASIC, which are mutually connected through internal buses. The ROM may store programs to control the operations in the printer 100. The CPU may run the programs with use of the RAM and the EEPROM.

The ASIC is electrically connected with the motors 271-274. The ASIC may generate and output controlling signals V21, V22, V23, V24 to rotate the feeder motor 271, the conveyer motor 272, the carriage motor 273, and the lift motor 274, respectively. The ASIC is electrically connected with the cover sensor 430, the liquid amount sensor 216, the registration sensor 151, the linear encoder 193, and the sheet sensor 205 and may receive the cover signals V11, the liquid amount signals V12, the registration signals V13, the position signals V15, and the sheet signals V16 from the cover sensor 430, the liquid amount sensor 216, the registration sensor 151, the linear encoder 193, and the sheet sensor 205, respectively. Moreover, the ASIC may transmit displayable image data, which is data describing information to be displayed, to the UI 500 and receive execution commands C11 from the UI 500.

The controller 270 has a total consumed amount counter in, for example, the EEPROM. The total consumed amount counter may be used to cumulatively estimate consumed ink amount in the reservoir section 220. The cumulation by the total consumed amount counter may start immediately after an ink injecting process. In the following paragraphs, a counter value indicated by the total consumed amount counter may be called as a counter value J.

[Image Recording Process by Controller 270]

When the printer 100 is standing by for image recording, the head 200, the cap 260, and the valve unit 240 are at positions shown in FIG. 8. In other words, the head 200 is standing by at a home position, which may be, in the present embodiment, the capped position P21. Meanwhile, the capped position P21 may also be an origin point, from which the head 200 starts moving in the widthwise direction 9. Optionally, however, the home position may be any position between the platen 180 and the cap 260 in the widthwise direction 9 or may be at a position rightward with respect to the cap 260. The cap 260 stays at the capping position P31 and covers the nozzles 203 of the head 200. The valve body 242 is subject to the contacting force of the opener member 250 and opens the atmosphere communication path 221K. The lid 230 closes the injection port 224A.

When the printer 100 is standing by or running an image recording process, the controller 270 may receive a print job and store the received print job in, for example, the RAM. A sender of the print job may be a personal computer or a smartphone which may communicate with the printer 100. The print job is an execution command for an image recording process and includes at least image data and setting information. The image data describes an image to be recorded in the image recording process. The image data may describe an image to be recorded on a single sheet M or a plurality of images to be recorded on a plurality of sheets M. The setting information describes settings for the image recording process including, for example, a size of the sheet(s) M, margins on the sheet(s) M, and resolutions of the image(s).

The controller 270 may select one of print jobs stored in the RAM and start an image recording process (see FIGS. 9A-9B) based on the selected print job.

As shown in FIG. 9A, in S101, the controller 270 generates driving signals based on the image data and stores the generated signals in the RAM. The driving signals may be used for driving the piezoelectric devices in the head 200 and are generated for the entire passes that are required to record the image described in the image data.

In S102, the controller 270 conducts a cumulation process for an estimated consumable amount. The estimated consumable amount is an amount of the ink to be consumed by the head 200 with the piezoelectric devices driven by the driving signals generated in S101. Moreover, in S102, the controller 270 adds the estimated consumable amount to the counter value J in the total consumed amount counter.

In S103, the controller 270 determines whether the current counter value J exceeds a volume threshold value. The volume threshold value indicates a predetermined amount of the ink storable in the ink reservoir chamber 220B between the lower index 223L and the upper index 223U. When the controller 270 determines that the current counter value J exceeds the volume threshold value, the controller 270 proceeds to S117. When the controller 270 determines that the current counter value J does not exceed the volume threshold value, the controller 270 proceeds to S104.

In S104, the controller 270 determines whether an empty flag in the RAM or the EEPROM is off. The empty flag may be set off after an ink injecting process (S117-S120), which will be described further below. The empty flag may be set on in a remaining amount verifying process in S115 (see FIG. 9B), which will be described further below. When the empty flag is off, the controller 270 proceeds to S105; but when the empty flag is on, the controller 270 proceeds to S117.

In S105, the controller 270 conducts a flushing process. In particular, as an earlier step in the flushing process, the controller 270 conducts a separating step, in which the controller 270 determines whether the cap 260 is located at the capping position P31 (see FIG. 4). If the controller 270 determines that the cap 260 is located at the capping position P31, the controller 270 outputs the controlling signals V24 to control the lift motor 274 to lower the cap 260 to the uncapping position P32 (see FIG. 5). When the controller 270 determines that the cap 260 is located at uncapping position P32. the controller 270 exits the separating step and proceeds to a latter step in the flushing process without moving the cap 260.

As a latter step in the flushing process, the controller 270 moves the head 200 in the widthwise direction 9 to the flushing position P22. In particular, the controller 270 outputs the controlling signals V23 to the carriage motor 273 to control the conveyer 210 to move the carriage 190 in the widthwise direction 9. While the carriage 190 is being moved, the controller 270 determines an updated position of the head 200 based on the position signals V15 from the linear encoder 193. Until the updated position matches the flushing position P22, the controller 270 continues moving the head 200 in the widthwise direction 9 toward the flushing position P22. When the updated position of the head 200 matches the flushing position P22, the controller 270 stops the head 200 at the flushing position P22 and controls the head 200 staying over the ink receiver 194 to discharge the ink at the ink receiver 194. The flushing process is thus conducted.

After the flushing process, further in S105, the controller 270 conducts a moving process, in which the controller 270 outputs the controlling signals V23 to the carriage motor 273 and moves the head 200 from the flushing position P22 to the home position, i.e., the capped position P21. Meanwhile, the controller 270 monitors updated positions of the head 200 periodically and, when the updated position matches the capped position P21, the controller 270 stops outputting the controlling signals V23. The process in S105 ends thereat.

In S106, the controller 270 selects a part of the driving signals stored in the RAM for a pass to be run in an ink discharging process in S110 (see FIG. 9B).

In S107, the controller 270 conducts a cueing process and controls one of the sheets M in the feeder tray 110 to be conveyed to a cueing position, which is a position in the linear path P2 straight below the sheet sensor 205. In particular, the controller 270 outputs the controlling signals V21 to the feeder motor 271 to control the feeder roller 133 to convey the sheet M in the curved path P1. While outputting the controlling signals V21, the controller 270 obtains the registration signals V13 periodically and stops outputting the controlling signals V21 in response to a change of the levels of the registration signals V13. Thus, the sheet M may pause at the conveyer roller pair 160.

In the cueing process, moreover, after stopping the controlling signals V21, the controller 270 outputs the controlling signals V22 to the conveyer motor 272 to control the conveyer roller pair 160 to convey the sheet M to a cueing position in the linear path P2. While outputting the controlling signals V22, the controller 270 obtains the sheet signals V16 periodically and stops outputting the controlling signals V22 in response to a change of the levels of the sheet signals V16. Thus, the sheet M may pause on the supporting surface 181 with a frontward edge of the sheet M located at the cueing position.

In S108, the controller 270 determines an ink dischargeable range R11 (see FIG. 8) based on the size of the sheet M and the margin size contained in the setting information in the print job. The ink dischargeable range R11 is a range, in which the ink may be discharged at the sheet M on the supporting surface 181, and is a remainder of subtracting the margin size from each side of the sheet M.

In S109, the controller 270 conducts a first closing process including a moving process. In particular, the controller 270 outputs the controlling signals V23 to the carriage motor 273 to move the head 200 from the capped position P21 to a position straight above a discharge-start position in the ink dischargeable range R11. The discharge-start position is an initial position for the head 200 when an image for a single pass is to be recorded on the sheet M on the supporting surface 181.

Before S109, in other words, when the head 200 is located at the capped position P21, as shown in FIG. 8, the valve body 242 is in the condition to open the atmosphere communication path 211K by the contacting force from the opener member 250. From this position, while the head 200 moves from the capped position P21 to the position above the ink dischargeable range R11 in S109, the valve body 242 separates from the opener member 250 and closes the atmosphere communication path 221K by the urging force of the spring 241 (see FIG. 5). Thus, in S109, the switching assembly including the conveyer 210 and the opener member 250 may cause the valve body 242 to close the atmosphere communication path 221K.

In S109, moreover, in accordance with start of outputting the controlling signals V23, in other words, in accordance with the head 200 starting to move from the capped position P21, the controller 270 activates a timer contained therein to start measuring time.

In S110 (see FIG. 9B), the controller 270 conducts a conveying process, in which the head 200 is conveyed in a scanning direction, e.g., the widthwise direction 9, and an ink discharging process. The conveying process to convey the head 200 in the scanning direction may be hereinafter called as a scanning process. In particular, in the scanning process, the controller 270 outputs the controlling signals V23 to the carriage motor 273 to control the conveyer 210 to convey the head 200 in one way, i.e., rightward or leftward, in the scanning direction for a pass.

After the first closing process (S109), the ink discharging process may be conducted with the atmosphere communication path 221K being closed and while the controlling signals V23 are being output in the scanning process. In particular, while the head 200 is moving above the ink dischargeable range R11, the controller 270 applies the driving signals selected in either S106 (see FIG. 9A) or S114 (see FIG. 9B) to the piezoelectric devices in the head 200. Therefore, the piezoelectric devices may be driven, and the ink may be discharged from the head 200 through the nozzles 203. Accordingly, the image for the pass along the scanning direction may be recorded on the sheet M.

Having finished outputting the driving signal in the pass, the controller 270 stops outputting the controlling signals V23 and exits S110.

In S111, the controller 270 determines whether the elapsed time measured by the timer reaches a time threshold value. The time threshold value may be determined by a manufacturer in advance through calculations and experiments. The time threshold value indicates a time, which is shorter than a time determined by the manufacturer based on the experiments that may cause menisci at the nozzles 203 to collapse due to a negative pressure in the inner space 220A. When the elapsed time does not reach the time threshold value, the controller 270 proceeds to S113, or when the elapsed time reached the time threshold value, the controller 270 proceeds to S112.

In S112, the controller 270 conducts an opening process to move the head 200 to reciprocate in the scanning direction between the updated position and the capped position P21. In particular, the controller 270 obtains the position signals V15 from the linear encoder 193, obtains the updated position of the head 200 based on the position signals V15, and saves the updated position in, for example, the RAM, as a resume position for the ink discharging process. Moreover, the controller 270 may move the head 200 rightward toward the capped position P21, similarly to S105 (see FIG. 9A), and move the head 200 leftward to return to the resume position. In this series of movements, when the head 200 reaches the capped position P21, the valve body 242 may receive the contacting force of the opener member 250 and open the atmosphere communication path 221K. In S112, the controller 270 may initialize the timer and start measuring a length of time.

In S113, the controller 270 determines whether an entire image for the sheet M is completely recorded. When the controller 270 determines that the image recording is not completed, the controller 270 proceeds to S114, or when the controller 270 determines that the image recording is completed, the controller 270 proceeds to S115.

In S114, the controller 270 selects another part of the driving signals for a next pass. Moreover, the controller 270 outputs the controlling signals V22 to the conveyer motor 272 to control the conveyer roller pair 160 to convey the sheet M in the conveying orientation 4, e.g., frontward, by a distance equal to a single pass in the conveying orientation 4. The controller 270 proceeds to S110.

In S115, the controller 270 conducts an ejecting process to eject the printed material M. In particular, the controller 270 may output the controlling signals V22 to the conveyer motor 272 to control the conveyer roller pair 160 and the ejection roller pair 170 to eject the printed material M through the sheet outlet 370 at the ejection tray 120.

In S115, the controller 270 conducts the remaining amount verifying process and, when the controller 270 determines that the level of the liquid amount signals V12 indicates the surface of the ink being higher than the lower index 223L, the controller 270 sets the empty flag off. On the other hand, when the controller 270 determines that the level of the liquid amount signals V12 indicates the surface of the ink being lower than or equal to the lower index 223L, the controller 270 determines that the amount of the ink in the reservoir section 220 reaches an injection threshold amount and sets the empty flag on.

In S116, the controller 270 determines whether image recording to record the entire images on the sheets M is completed. When the controller 270 determines that the image recording is not completed, the controller 270 proceeds to S104 (see FIG. 9A); or when the controller 270 determines that the image recording is completed, the controller 270 ends the image recording process shown in FIGS. 9A-9B.

[Ink Injecting Process (S117-S120)]

As shown in FIG. 9A, the controller 270 conducts the ink ejecting process in S117-S 120.

In S117, the controller 270 conducts a displaying process to display a guidance image 510 (see FIG. 10A). In particular, the controller 270 transmits first displayable data to the UI 500, and the UI 500 displays the first guidance image 510 in accordance with the received first displayable data. As shown in FIG. 10A, the guidance image 510 may include a first operation button 501, a second operation button 502, and a message object 503. The first operation button 501 may be operated by a user who will start injecting the ink into the ink reservoir chamber 220B. The second operation button 502 may be operated by the user when the user completes injecting the ink into the ink reservoir chamber 220B. The message object 503 may inform the user that the ink reservoir chamber 220B needs to be refilled with the ink and provide the user with instructions for the ink injection in text and/or graphics. In FIG. 10A, however, graphical illustration of the instructions for the ink injection is omitted.

The user may follow the instructions and operate the first operation button 501 in advance to injecting the ink. In S118, the controller 270 may receive an execution command C11 passed from the UI 500 in response to the user's operation to the first operation button 501.

In S119, the controller 270 conducts a second closing process in response to receiving of the user's operation through the first operation button 501. In the second closing process, the atmosphere communication path 221K may be closed by the valve body 242 through the switching assembly. In particular, the controller 270 outputs the controlling signals V23 to the carriage motor 273 and controls the conveyer 210 to convey the carriage 190 leftward. The controller 270 continuously outputs the controlling signals V23 until the updated position obtained from the position signals V15 matches the injection position P22. The head 200 stops at the injection position P22. In the present embodiment, the injection position P22 is located leftward with respect to the platen 180. However, location of the injection position P22 may not be limited as long as the injection position P22 is separated leftward from the capped position P21. The head 200 moving from the capped position P21 toward the injection position P22 separates leftward from the opener member 250 (see FIG. 8). Therefore, as shown in FIG. 11, the valve body 242 may close the atmosphere communication path 221K by the urging force of the spring 241. In S119, occasionally, the head 200 may be moved toward the injection position P22 from a position different and leftward from the capped position P21. In other words, the atmosphere communication path 221K may be already closed when S119 starts. In such an occasion, the second closing process maintains the atmosphere communication path 221K closed.

After the operation to the first operation button 501, the user following the instructions (see FIG. 10A) for ink injection may open the cover 400 and thereafter remove the lid 230. Thereby, the injection port 224A may be exposed externally from the printer 100. The user may attach a bottle (not shown) containing the ink to the injection port 224A and pour the ink in the bottle to the ink reservoir chamber 220B until the surface of the ink reaches the upper index 223U. The user may close the injection port 224A with the lid 230 and thereafter close the cover 400, and operate the second operation button 502.

The controller 270, after stopping the controlling signals V23 in S119, proceeds to S120. In S120, the controller 270 obtains the cover signals V11 periodically. In response to the cover 400 shifting from the opening state to the closing state, i.e., change of the levels of the cover signals V11, and receiving of the user's operation through the second operation button 502, the controller 270 initializes the counter value J to zero (0). In S120, moreover, the controller 270 sets the empty flag off. Thereafter, the controller 270 proceeds to S105.

[Benefits]

In the printer 100, while the controller 270 is conducting the ink discharging process in S110 (see FIG. 9B), the sheet M being conveyed may occasionally be jammed in the linear path P2. The jammed sheet M may contact the nozzles 203 in the head 200, and the ink in the head 200 may leak out to spread on the sheet M. However, in the printer 100, the valve body 242 closes the atmosphere communication path 221K while the ink discharging process is being conducted; therefore, the air chamber 220C is not connected with the outside atmosphere. Accordingly, even when the ink leaks out from the head 200, due to the lowered air pressure in the inner space 200A, which is lower than the pressure of the outside atmosphere, the ink may be restrained from leaking continuously or excessively. Thus, the leakage may be restrained from growing.

In S110, as the ink is discharged from the head 200, the air pressure in the inner space 220A may be lowered. However, in the printer 100, following S110, the opening process is conducted in S112 (see FIG. 9B) to open the atmosphere communication path 221K. Therefore, the air may be drawn into the air chamber 220C, and the air pressure in the inner space 220A may be leveled or relax. Accordingly, the menisci of the ink formed in the nozzles 203 may be restrained from collapsing.

While the ink injecting process is being conducted in S117-S120 (see FIG. 9A), the valve body 242 closes the atmosphere communication path 221K. Therefore, the ink and the air may not be exchanged between the ink reservoir chamber 220B and the air chamber 220C. Accordingly, the air in the air chamber 220C may be maintained while the ink injection process is being conducted. With the air maintained in the air chamber 220C, reduction of the air pressure in the inner space 220A may be moderated while the ink injection process is being conducted. Therefore, the head 200 may be restrained from malfunctioning in discharging the ink.

The air chamber 220C is located at an upper position with respect to the upper index 223U. Therefore, the air may stay in the air chamber 220C easily.

The inner communication path 220E is located at an upper position with respect to the upper index 223U. Therefore, the ink may not reach the inner communication path 220E easily. Moreover, with the ink not being able to reach the inner communication path 220E easily, the ink may not form a meniscus in the inner communication path 220E easily. Furthermore, during the ink discharging process, the ink may be supplied to the head 200 steadily.

Meanwhile, the injection port 224A is closed by the lid 230. Therefore, during the ink discharging process, the air may not be drawn into the ink reservoir chamber 220B through the injection port 224A.

The air chamber 220C is at least partly located to be higher than the outflow port 221L. Therefore, even if the user fails to close the injection port 224A after refilling the ink reservoir chamber 220B with the ink, the ink in the ink reservoir chamber 220B may be consumed completely in the image recording process(es).

The second closing process may be conducted in response to receiving of the user's operation to the first operation button 501 through the UI 500. Therefore, it may be likely that the user refills the reservoir section 220 after operating the first operation button 501. Accordingly, the initialization of the counter value J and the empty flag being off may reflect the condition of the ink reservoir chamber 220B after refilling correctly.

In this regard, for example, the user after opening the cover 400 may occasionally conduct an act, e.g., clearing the sheet jam, other than refilling the reservoir section 220. Therefore, if, for example, the second closing process is to be conducted based on the opening/closing acts of the cover 400, the initialized counter value J and/or the empty flag being off may not reflect the condition of the ink reservoir chamber 220B after refilling correctly.

For another example, if the inner communication path 220E is located to be higher than the upper index 223U, the space in the ink reservoir chamber 220B lower than the upper index 223U may be in a shape of an approximately rectangular cuboid. In this arrangement, when the ink is being injected, the surface of the ink may rise slowly.

The atmosphere communication path 221K is arranged in the right-side wall 221C, and the inner communication path 220E is arranged in the air chamber 220C in proximity to the second left-side wall 221F. In this arrangement, when the atmosphere communication path 221K is open, the air may flow into the inner communication path 220E from the atmosphere communication path 221K through the air chamber 220C without stagnating. Therefore, debris, e.g., paper dust, may be restrained from accumulating at corners of the air chamber 220C over time.

Modified Examples

Although an example of carrying out the invention has been described, those skilled in the art will appreciate that there are numerous variations and permutations of the liquid discharging apparatus that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters. Below will be described modified examples of the present embodiment.

First Modified Example of Reservoir Section 220

For example, the inner communication path 220E may not necessarily be located to at the upper position with respect to the upper index 223U entirely, but, as shown in FIG. 10B, the lower end of the inner communication path 200E may be located at the same position in the vertical direction 7 as the upper index 223U.

In this arrangement, while the user may visually recognize the surface of the ink in the ink reservoir chamber 220B and the inner communication path 220E through the front wall 221G with the upper index 223U formed thereon, the surface of the ink may be aligned with the upper index 223U and the lower end of the inner communication path 220E easily. Accordingly, the controller 270 may determine whether the current counter value J exceeds the volume threshold value in S103 (see FIG. 9A) more correctly.

For another example, as shown in FIG. 10C, the lower end of the inner communication path 220E may be located at a lower position with respect to the upper index 223U in the vertical direction 7.

In this arrangement, when the user views the upper index 223U, the upper index 223U may overlap the inner communication path 220E, which is visible through the front wall 221G. Therefore, visibility of the upper index 223U may be improved.

Modified Examples of Timing to Conduct Second Closing Process

In the embodiment described above, the second closing process in S119 (see FIG. 9A) may be conducted in response to receiving of the execution command C11 in S118. In other words, receiving of the execution command C11 is a predetermined condition to be satisfied before refilling the reservoir section 220 with the ink. However, optionally, the controller 270 may conduct the second closing process based on another condition.

For example, the controller 270 may conduct S119 based on a condition that the cover sensor 430 detects absence of the frontward part of the cover 400 at the lower-limit position P11. In particular, in S118, the controller 270 may determine the level of the cover signals V11 changed, e.g., from a higher level to a lower level, and in response to the frontward end of the cover 400 leaving the lower-limit position P11, the controller 270 may conduct S119.

For another example, the controller 270 may conduct S119 based on a condition that the liquid amount sensor 216 detects the surface of the ink in the ink reservoir chamber 220B descends to the position of the lower index 223L or lower.

Modified Example of Switching Assembly

For another example, the switching assembly may not necessarily have the conveyer 210, the valve unit 240, and the opener member 250 but may consist of, for example, an electromagnetic valve. The electromagnetic valve may include a solenoid and a valve body made of, for example, iron. The controller 270 may apply current to the solenoid, and thereby the valve body may be attracted to the solenoid. Accordingly, the atmosphere communication path 221K may open. On the other hand, when the controller 270 does not apply current to the solenoid, the valve body may separate from the solenoid and close the atmosphere communication path 221K.

Modified Examples of Timing to Conduct Opening Process

In the embodiment described above, the opening process in S112 (see FIG. 9B) may be conducted once the elapsed time exceeded the time threshold value and between passes, i.e., between recording of images in two consecutive passes. However, the opening process may be conducted after each of the steps S104-S106 (see FIG. 9A) or during each of the steps S104-S106 (see FIG. 9A).

For example, the opening process may be conducted after image recording for a pass is completed and before image recording for a next pass starts. For another example, the opening process may be conducted after image recording for a predetermined number of passes is completed and before image recording for a next pass starts. The predetermined number may be greater than or equal to 2 and may either be a fixed number or a variable number.

For another example, the opening process may be conducted between sheets M, i.e., between recording images on two consecutive sheets M. For example, the opening process may be conducted after an image is completely recorded on a sheet M and before another image is recorded on another sheet M. For another example, the opening process may be conducted after images are completely recorded on a predetermined number of sheets M and before another image is recorded on another sheet M. The predetermined number may be greater than or equal to 2 and may either be a fixed number or a variable number.

For another example, the opening process may be conducted between print jobs, i.e., after recording of the entire image(s) contained in the image data in the print job is completed. In particular, when the printer 100 executes a plurality of print jobs stored in the RAM sequentially, the opening process may be conducted between two consecutive print jobs. For another example, the opening process may be conducted after images for a predetermined number of print jobs are completely recorded and before another image for another print job is recorded. The predetermined number may be greater than or equal to 2 and may either be a fixed number or a variable number.

For another example, a rotary encoder may be attached to the driving roller 161 (see FIG. 2). The rotary encoder may have an encoder disc and an encoder sensor, and may output pulse signals indicating a rotation amount of the driving roller 161 to the controller 270. With the rotary encoder, the controller 270 may determine the timing to conduct the opening process based on the pulse signals. In particular, the controller 270 may obtain an amount of the sheets M being conveyed by the conveyer roller pair 160 in the conveying orientation 4 based on the pulse signals and may conduct the opening process in accordance with the conveying amount reaching a conveyance threshold value.

For another example, the controller 270 may obtain an updated position of the head 200 in the scanning direction based on the position signals V15 from the linear encoder 193 and may conduct the opening process in accordance with the updated position of the head 200 matching a predetermined position.

Moreover, when the switching assembly consists of an electromagnetic valve, the opening process may be conducted similarly at any timing between passes, between sheets, or between jobs. Further, while the controller 270 may conduct S111 and S112 in parallel with S110 (see FIG. 9B), the controller 270 may conduct the opening process immediately after the elapsed time reaches the time threshold value in S111, even when the ink discharging process in S110 is in progress.

Second Modified Example of Reservoir Section 220

In the embodiment described above, the air chamber 200C and the ink reservoir chamber 220B in the reservoir section 220 are delimited mutually by the crosswise divider wall 222A (see FIGS. 5 and 10B-10C). However, the reservoir section 220 may not necessarily have the crosswise divider wall 222A, as shown in FIGS. 12A-12C. Without the crosswise divider wall 222A, the air chamber 220C may be an area enclosed by the right-side wall 221C, the second upper wall 221E, the second left-side wall 221F, the front wall 221G, and the rear wall 221H. Meanwhile, the atmosphere communication path 221K may connect the ink reservoir chamber 220B and the outside of the reservoir section 220 through a cavity, i.e., air, in the atmosphere communication path 221K and a cavity, i.e., air, in the air chamber 220C.

Modified Example of Opener Member 250

In the embodiment described above, the opener member 250 protrudes from the frame 301 toward the valve body 242 (see, for example, FIG. 4). However, alternatively, the opener member 250 may protrude from the valve body 242 outward from the outer wall 221 through the atmosphere communication path 221K, as shown in FIGS. 13A-13B. In this arrangement, the opener member 250 may contact the frame 301 as the head 200 moves toward the capped position P21, and thereby the valve body 242 may open the atmosphere communication path 221K (see FIG. 13A). On the other hand, the opener member 250 may separate from the frame 301 as the head 200 leaves the capped position P21, and thereby the valve body 242 may close the atmosphere communication path 221K (see FIG. 13B).

More Examples

For another example, the printer 100 may not necessarily be limited to the monochrome image recording apparatus but may be a printer capable of recording a full-colored or multicolored image on the sheet M. When the printer 100 is a full-color or multicolor printer, the inner space 220A in the reservoir section 220 may be divided by, for example, divider walls, into a plurality of ink reservoir chambers 220B, each of which may contain a different-colored ink.

For another example, the liquid discharging apparatus may not necessarily be limited to the printer 100 as described above but may be a multifunction peripheral machine, a copier, and a facsimile machine. The multifunction peripheral machine may be an apparatus equipped with a plurality of functions among a printing function, a copying function, and a facsimile transmitting/receiving function.

For another example, when the printer 100 is standing by, the head 200 may not necessarily stand by at the capped position P21 to receive the contacting force from the opener member 250 and open the atmosphere communication path 221K, but the head 200 may stand by at a home position different from the capped position P21. The home position may be, for example, located between the platen 180 and the cap 260 in the widthwise direction 9 or may be, for another example, located rightward with respect to the cap 260. When the head 200 is at the home position, the valve body 242 may close the atmosphere communication path 221K by the urging force of the spring 241.

In order to place the head 200 to stand by at the home position, the controller 270 may move the head 200 to the home position in accordance with the affirmative determination in S116 (S116: YES in FIG. 9B). Thereby, the valve body 242 may close the atmosphere communication path 221K.

For another example, the printer 100 may have a line-formation printing head in place of the serial-formation printing head 200 when the switching assembly consists of an electromagnetic valve. In the printer 100 with the line-formation printing head 200, the head 200 may not be conveyed in the scanning direction but may stay still in the widthwise direction 9 at a position above the platen 180 while discharging the ink.

For another example, the printer 100 may not necessarily be limited to the on-carriage printer but may be a so-called off-carriage printer, in which the reservoir section 220 may not be mounted on the carriage 190 but may be located separately from the carriage 190. When the printer 100 is the off-carriage printer, the reservoir section 220 may not move in the widthwise direction 9 inside the housing 300; therefore, the switching assembly may preferably consist of an electromagnetic valve.

For another example, the reservoir section 220 may not necessarily be the ink tank fixed to the head 200 but may be a cartridge detachably attached to the head 200.

What is claimed is:

1. A liquid discharging apparatus, comprising:
- a head configured to discharge liquid;
- a reservoir section, having:
  - a liquid reservoir chamber;
  - an air chamber connected with the liquid reservoir chamber;
  - an injection port connecting the liquid reservoir chamber and outside of the reservoir section, the injection port being configured to accept the liquid; and
  - an atmosphere communication path connecting the air chamber and the outside of the reservoir section,
- a valve configured to open and close the atmosphere communication path;
- a switching assembly configured to switch states of the valve between an opening state, in which the valve opens the atmosphere communication path, and a closing state, in which the valve closes the atmosphere communication path; and
- a controller configured to
  - control the valve through the switching assembly to close the atmosphere communication path before the liquid is injected through the injection port;
  - control the valve through the switching assembly to open the atmosphere communication path after the liquid is injected through the injection port;
  - control the valve through the switching assembly to close the atmosphere communication path before discharging the liquid; and
  - control the head to discharge the liquid with the atmosphere communication path being closed.

2. The liquid discharging apparatus according to claim 1, further comprising an index indicating a surface level of a maximum amount of the liquid storable in the liquid reservoir chamber,
- wherein the air chamber is at least partly located at an upper position with respect to the index.

3. The liquid discharging apparatus according to claim 2,
- wherein the reservoir section further has a communication path connecting the liquid reservoir chamber and the air chamber, the communication path being located at an upper position with respect to the index.

4. The liquid discharging apparatus according to claim 2,
- wherein the reservoir section further has a communication path connecting the liquid reservoir chamber and the air chamber, the communication path being located at a same position as the index in a vertical direction.

5. The liquid discharging apparatus according to claim 2,
- wherein the reservoir section further has a communication path connecting the liquid reservoir chamber and the air chamber, the communication path being located at a lower position with respect to the index.

6. The liquid discharging apparatus according to claim 1,
- wherein the reservoir section further has an outflow port, through which the liquid in the liquid reservoir chamber flows outward, and
- wherein the air chamber is at least partly located at an upper position with respect to the outflow port.

7. The liquid discharging apparatus according to claim 1, further comprising:

a housing accommodating the reservoir section;

a cover supported by the housing, the cover being movable between a first position, in which the reservoir section is exposed externally, and a second position, in which the reservoir section is concealed; and a cover sensor configured to detect absence of the cover at the second position, wherein the controller is configured to control the valve through the switching assembly to close the atmosphere communication path before the liquid is injected through the injection port on condition that the cover sensor detects absence of the cover at the second position.

8. The liquid discharging apparatus according to claim 1, wherein the controller is configured to control the valve through the switching assembly to close the atmosphere communication path before the liquid is injected through the injection port on condition that an operation indicating that the liquid is to be injected in the reservoir section is received.

9. The liquid discharging apparatus according to claim 1, further comprising a liquid amount sensor, the liquid amount sensor being configured to detect an amount of the liquid in the liquid reservoir chamber reaching an injection threshold value, wherein the controller is configured to control the valve through the switching assembly to close the atmosphere communication path before the liquid is injected through the injection port on condition that the liquid amount sensor detects the liquid amount reaching the injection threshold value.

10. The liquid discharging apparatus according to claim 1, wherein the controller is configured to control the valve through the switching assembly to close the atmosphere communication path on condition that an operation is received.

11. The liquid discharging apparatus according to claim 1, further comprising a cap located at a standby position of the head, wherein the reservoir section is separated from the cap when a lid is open, the lid being configured to open and close the injection port.

12. The liquid discharging apparatus according to claim 1, wherein the controller is configured to operate the reservoir section to move to a predetermined position and operate the valve through the switching assembly to close the atmosphere communication path, and the predetermined position is a position where the liquid is injected into the liquid reservoir chamber.

13. A liquid discharging apparatus, comprising:

a head configured to discharge liquid;

a reservoir section, having:

a liquid reservoir chamber;

an injection port connecting the liquid reservoir chamber and outside of the reservoir section, the injection port being configured to accept the liquid; and an atmosphere communication path connecting the liquid reservoir chamber and the outside of the reservoir section through a cavity, a valve configured to open and close the atmosphere communication path;

a switching assembly configured to switch states of the valve between an opening state, in which the valve opens the atmosphere communication path, and a closing state, in which the valve closes the atmosphere communication path; and a controller configured to control the valve through the switching assembly to close the atmosphere communication path before the liquid is injected through the injection port;

control the valve through the switching assembly to open the atmosphere communication path after the liquid is injected through the injection port;

control the valve through the switching assembly to close the atmosphere communication path before discharging the liquid; and control the head to discharge the liquid with the atmosphere communication path being closed.

* * * * *